US008726151B2

(12) United States Patent
Rahaman et al.

(10) Patent No.: US 8,726,151 B2
(45) Date of Patent: May 13, 2014

(54) COMPARING ENCRYPTED DOCUMENTS HAVING STRUCTURED DATA

(75) Inventors: Mohammad Ashiqur Rahaman, Nice (FR); Andreas Schaad, Karlsruhe (DE); Henrik Plate, Nice (FR); Yves Roudier, Valbonne (FR)

(73) Assignee: SAP AG, Walldorf (DE)

( * ) Notice: Subject to any disclaimer, the term of this patent is extended or adjusted under 35 U.S.C. 154(b) by 604 days.

(21) Appl. No.: 12/757,477

(22) Filed: Apr. 9, 2010

(65) Prior Publication Data

US 2011/0252310 A1    Oct. 13, 2011

(51) Int. Cl.
*G06F 17/24* (2006.01)
(52) U.S. Cl.
CPC .................................. *G06F 17/24* (2013.01)
USPC ......................................................... 715/255
(58) Field of Classification Search
CPC ............................................................ G06F 17/24
USPC .......................................................... 715/255
See application file for complete search history.

(56) References Cited

PUBLICATIONS

Yang et al., "Reliable Group Rekeying: A Performance Analysis", 2001, pp. 1-48.*
"Change Purchase Order," SAP AG, Apr. 29, 2009, 9 pages.
Simon et al., "XML Encryption Syntax and Processing," Aug. 16, 2000, 14 pages.
European Search Report for Application No. 11 002 702.6 dated Aug. 4, 2011, 6 pages.
Nicholas Chase, developerWorks, "Understanding DOM," IBM Corporation, Jul. 29, 2003, 36 pages.
Sudarshan S. Chawathe, et al., "Change Detection in Hierarchically Structured Information," SIGMOD '96: Proceedings of the 1996 ACM SIGMOD International Conference on Management of Data, 1996, New York, NY, USA, 31 pages.
Sudarshan S. Chawathe, et al., "Meaningful Change Detection in Structured Data," SIGMOD '97: Proceedings of the 1997 ACM SIGMOD International Conference on Management of Data, New York, NY, USA, 1997, 12 pages.
Michael Kay, Saxonica Limited, "Saxon: Anatomy of an XSLT Processor," http://www.ibm.com/developerworks/xml/library/x-xslt2/, Feb. 1, 2001, 14 pages.
Andrew Nierman, et al., University of Michigan, "Evaluating Structural Similarity in XML Documents," Fifth International Workshop on the Web and Databases (WebDB 2002), Jun. 2002, Madison, Wisconsin, USA, 6 pages.

(Continued)

*Primary Examiner* — Laurie Ries
*Assistant Examiner* — Shawn S Joseph
(74) *Attorney, Agent, or Firm* — Fish & Richardson P.C.

(57) ABSTRACT

The present disclosure is directed to comparing a first structured data document to a second structured data document, including receiving the first and second structured data documents as first and second encrypted documents, respectively, comparing nodes of the first encrypted document to nodes of the second encrypted document, a content and a location of each of the nodes remaining confidential during the comparing, generating matched pairs of nodes based on the comparing, and storing the matched pairs in computer memory, each matched pair comprising a node of the first encrypted document and a corresponding node of the second encrypted document, determining one or more edit operations based on the matched pairs, and generating an edit script comprising the one or more edit operations, the edit script being executable to transform the first encrypted document to provide a transformed encrypted document that is isomorphic to the second encrypted document.

20 Claims, 16 Drawing Sheets

(56) References Cited

PUBLICATIONS

Rakesh Agrawal, et al., IBM Almaden Research Center, "Order Preserving Encryption for Numeric Data," SIGMOD '04: Proceedings of the 2004 ACM SIGMOD International Conference on Management of Data, New York, NY, USA, 2004, 12 pages.

Philippe Le Hégaret, et al., W3C DOM Interest Group, "Document Object Model (DOM)," http://www.w3.org/dom/, Jan. 19, 2005, 3 pages.

Mohammad Ashiqur Rahaman, et al., Institut Eurécom, Research Report RR-09-227: "An Efficient Comparison Technique for Sanitized XML Trees," Sophia-Antipolis, France, May 5, 2009, 27 pages.

Mohammad Ashiqur Rahaman, et al., SAP Research, EURECOM, "A Secure Comparison Technique for Tree Structured Data," The Fourth International Conference on Internet and Web Applications and Services, May 2009, 6 pages.

Mohammad Ashiqur Rahaman, et al., SAP Research, EURECOM, "Ontology-Based Secure XML Content Distribution," *Emerging Challenges for Security, Privacy and Trust*, 2009, 13 pages.

David Megginson, "About Sax," http://www.saxproject.org/, Megginson Technologies Ltd., retrieved on Mar. 30, 2010, 1 page.

\* cited by examiner

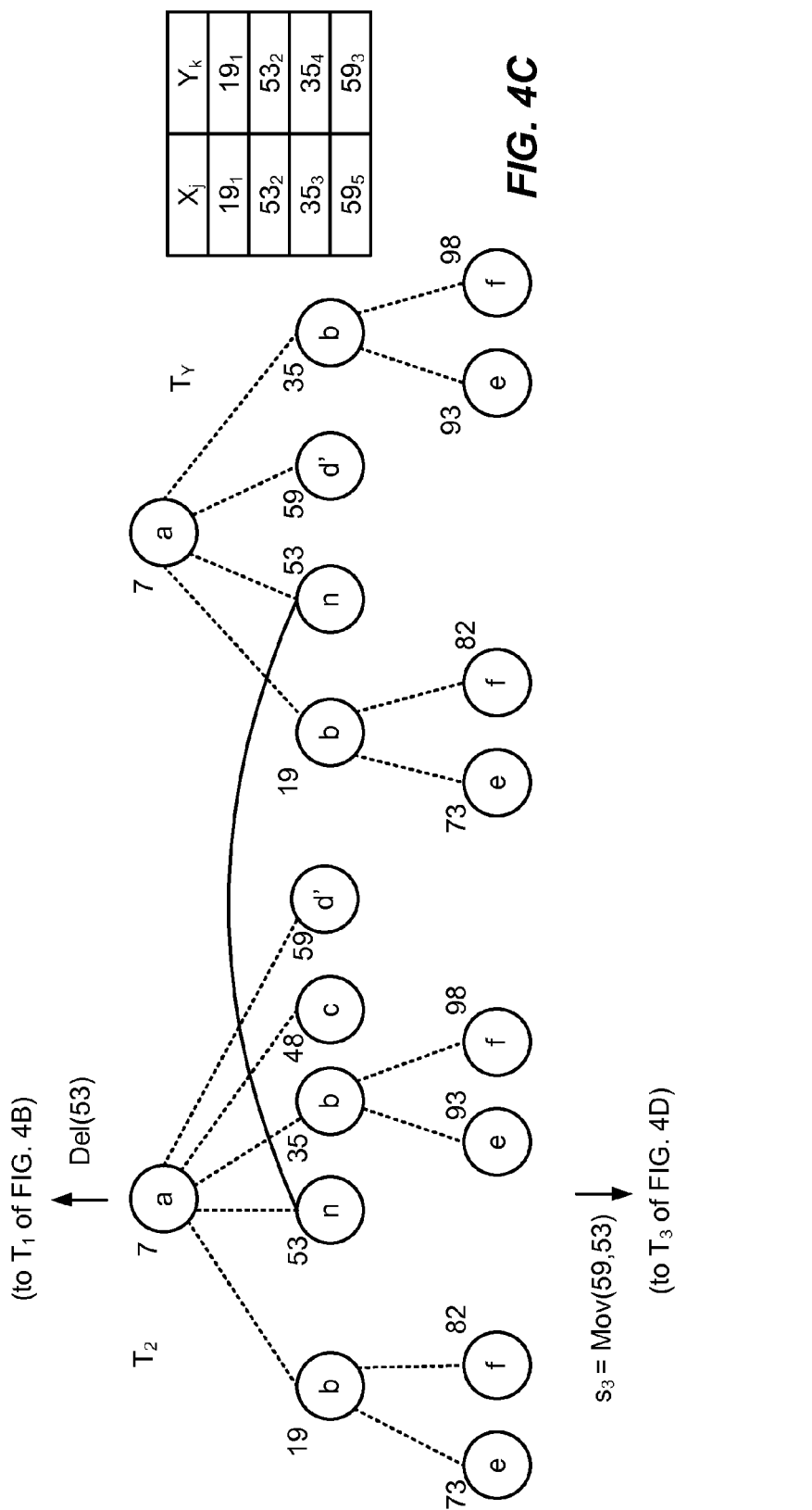

COMPARING ENCRYPTED DOCUMENTS HAVING STRUCTURED DATA

BACKGROUND

The comparison of large documents including data structures (e.g., enterprise XML documents) is a processing and memory intensive task. For example, traditional comparison techniques require the complete data structures and any normalized forms of the data structures to be computed and stored in memory before executing any comparisons. Consequently, the task of comparing such documents is outsourced to third-party vendors. Outsourcing of such tasks, however, has implications with respect to security and integrity of the data.

SUMMARY

Implementations of the present disclosure include methods for comparing a first structured data document to a second structured data document. In some implementations, a method includes receiving, at a computing device, the first and second structured data documents as first and second encrypted documents, respectively, the first and second encrypted documents being transmitted to the computing device from a remote computing device over a network, comparing nodes of the first encrypted document to nodes of the second encrypted document, a content and a location of each of the nodes remaining confidential during the comparing, generating matched pairs of nodes based on the comparing, and storing the matched pairs in computer memory, each matched pair comprising a node of the first encrypted document and a corresponding node of the second encrypted document, determining one or more edit operations based on the matched pairs, and generating an edit script comprising the one or more edit operations, the edit script being executable by one or more processors to transform the first encrypted document to provide a transformed encrypted document that is isomorphic to the second encrypted document.

In some implementations, determining one or more edit operations includes executing a difference function to process an encrypted value of a first node of the matched pair and an encrypted value of a second node of the matched pair, generating a non-zero value based on the executing, generating an update operation to update the encrypted value of the first node based on the encrypted value of the second node, and adding the update operation to the edit script.

In some implementations, determining one or more edit operations includes determining that a node of the first encrypted document is absent from the matched pairs, generating a delete operation to delete the node, and adding the delete operation to the edit script.

In some implementations, determining one or more edit operations includes determining that a node of the second encrypted document is absent from the matched pairs, generating an insert operation to insert the node, and adding the insert operation to the edit script.

In some implementations, determining one or more edit operations includes determining that a sibling node of a first node of a matched pair and a sibling node of a second node of the matched pair are different, generating a move operation to move the first node such that a sibling node of the first node is the same as the sibling node of the second node, and adding the move operation to the edit script.

In some implementations, the first and second encrypted documents each include a tree data structure, and the comparing includes a level-by-level comparison of nodes of the first and second encrypted documents from root to leaves.

In some implementations, the edit script is provided as a minimum cost edit script (MCES).

In some implementations, the method further includes transmitting the edit script to the remote computing device over the network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIGS. 4A-4E include functional block diagrams illustrating a step-wise transformation from the initial data structure to the edited data structure of FIG. 3.

Like reference symbols in the various drawings indicate like elements.

DETAILED DESCRIPTION

Implementations of the present disclosure are generally directed to comparison techniques and supporting algorithms for documents including structured data, and providing a minimum cost edit script based on the comparison. Implementations include the comparison of sanitized extensible mark-up language (XML) documents to provide a minimum cost edit script (MCES) describing the transformation of an initial XML document to an edited XML document. Implementations provided herein use encrypted integer labels (EBOL) to encode the structure and content of the initial XML document to provide the sanitized XML document, which is only viewable by an authorized party. In this manner, a third party can compare the XML documents without relying on any intermediate normalization thereof.

Figure 1:
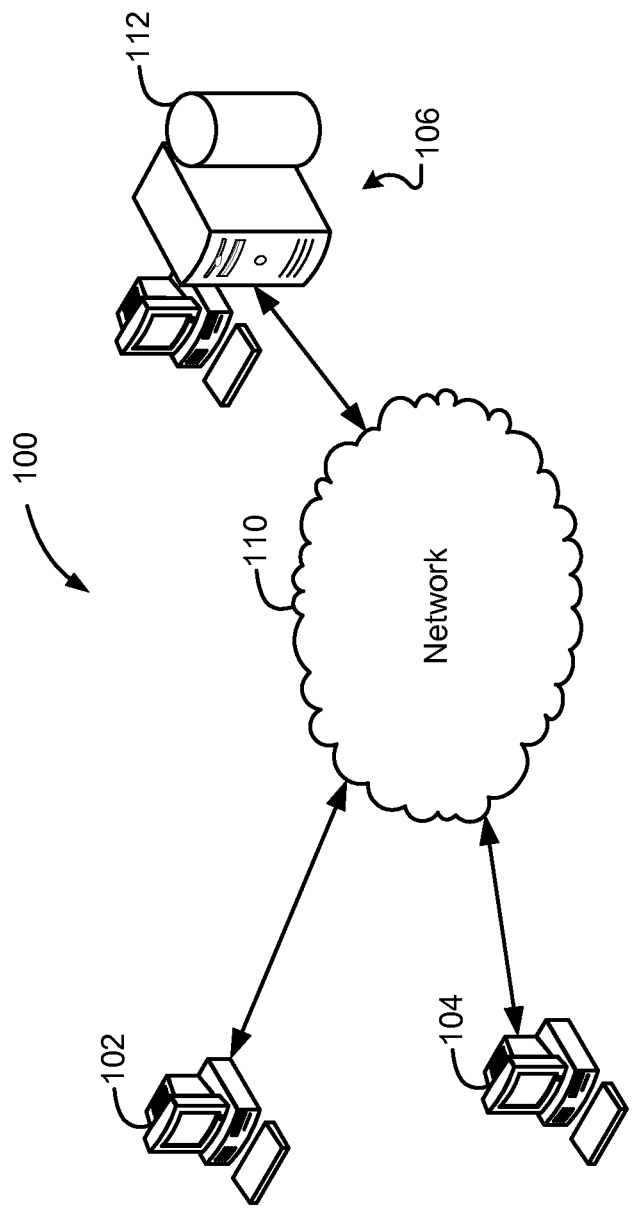
FIG. 1 is a schematic illustration of an exemplar system architecture in accordance with implementations of the present disclosure.

Referring now to FIG. 1, a schematic illustration of an exemplar system 100 is provided. The system 100 can be used to realize implementations of the present disclosure. The system 100 includes a plurality of computing systems 102, 104, 106 that communicate with one another over a network 110. The network can be provided as a large computer network, such as a local area network (LAN), wide area network (WAN), the Internet, a cellular network, or a combination thereof connecting any number of mobile clients and servers.

The computing systems 102, 104, 106 represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. By way of exemplar reference to the computing system 106, the computing systems 102, 104, 106 can each include a database 112, a server 114, and/or a computing device 116. Implementations can include various forms of servers including, but not limited to a web server, an application server, a proxy server, a network server, and/or a server farm. In general, the computing system 106 can accept user requests and corresponding data for application services and provides such services to any number of client devices (e.g., computing devices 102, 104) over the network 110.

Figure 2:
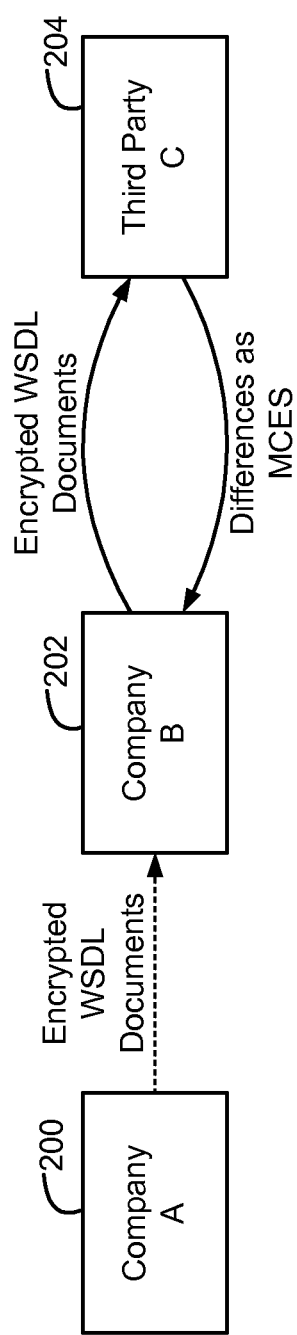
FIG. 2 is a block diagram illustrating an exemplar communication between multiple parties.

Referring now to FIG. 2, a functional block diagram illustrates an exemplar communication between multiple parties. By way of non-limiting example, the multiple parties can include a first company 200 ("Company A"), a second company 202 ("Company B") and a third company 204 ("Company C"). The first company 200 can be associated with the computing system 102 of FIG. 1, for example, and can communicate data with the second company 202 and/or the third company 204 over the network 110. The second company 202 can be associated with the computing system 104 of FIG. 1, for example, and can communicate data with the first company 200 and/or the third company 204 over the network 110. The third company 204 can be associated with the computing system 106 of FIG. 1, for example, and can communicate data with the first company 200 and/or the second company 202 over the network 110. Structured data documents can be transferred between the companies 200, 202, 204. Such structured data documents can include XML documents, for example, having a tree structure including one or more levels with each level including one or more nodes.

By way of non-limiting example, the second company 202 can implement one or more web services made available by the first company 200 over the network 110. The first company 200 and the second company 202 can have a shared key, such that the first company 200 always provides encrypted web service definition language (WSDL) documents that only the second company 202 can read using the shared key. The second company 202 can appoint the third company 204 to compare and monitor different, encrypted WSDL documents provided to the second company 202 from the first company 202 over a period of time to determine the changes between the various WSDL documents. Specifically, implementations of the present disclosure, described in further detail herein, enable the third company 204 to compare different versions of encrypted WSDL documents to determine changes therebetween. The third company 204 can generate a MCES without having to decrypt the WSDL documents. The MCES describes a transformation between one version of the document (i.e., an initial version) and another version of the document (i.e., an edited version).

Figure 3:
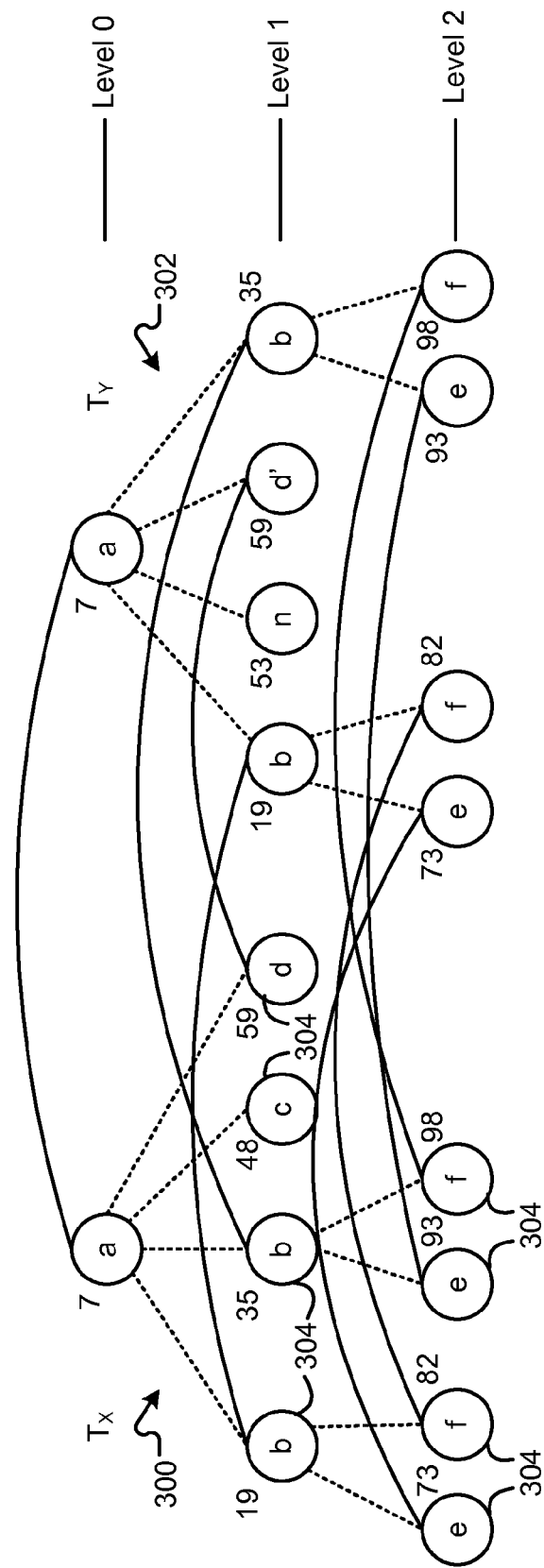
FIG. 3 is a block diagram illustrating an exemplar comparison between an initial data structure and an edited data structure.

Referring now to FIG. 3, a block diagram illustrates an exemplar comparison between an initial document 300 and an edited document 302. The initial document 300 includes a tree structure referenced as tree $T_X$, and the edited document 302 includes a tree structure referenced as tree $T_Y$, which will be referenced throughout the present disclosure as a non-limiting, running example. For purposes of illustration, the following notations will be used. Tree levels include levels $0, \ldots, 1$, with $1_{FINAL}$ indicating the lowest level in a tree (e.g., level 2 in FIG. 3). Nodes 304 of a given level of tree $T_X$ are indicated as nodes $x_1, \ldots x_j$ with $j_1$ indicating the total number of nodes for a given level 1 in tree $T_X$. Nodes of a given level of tree $T_Y$ are indicated as nodes $y_1, \ldots, y_k$ with $k_1$ indicating the total number of nodes for a given level 1 in tree $T_Y$. M designates a set of matched pairs including $M_1, \ldots, M_p$ matched pairs in the set.

With continued reference to FIG. 3, the trees $T_X$, $T_Y$ each have two levels of nodes 304 (e.g., XML nodes), not counting the level of the root nodes (i.e., level 0). Each node 304 includes an associated annotation (e.g., 19, 35, 48 and 59). As discussed in further detail below, the annotations can include encrypted node identifier values.

In accordance with implementations of the present disclosure, a comparer (e.g. a third party) can determine the differences between the documents 300, 302 to find an appropriate transformation from $T_X$ to $T_Y$ provided as a MCES. A correspondence between nodes of the trees $T_X$, $T_Y$ can be determined and are indicated by the solid lines of FIG. 3. Once a correspondence, or match is determined, an insertion or deletion of nodes can be identified (e.g., insert node n and delete node c in FIG. 3). In an exemplar context, the nodes to be matched can include encrypted values of XML nodes that may be updated in different versions of the document. The differences between the versions of hierarchical structured data can be described by the MCES, which includes a sequence of edit operations that can be performed sequentially over the transformed versions starting with the initial tree (e.g., $T_X$). The edit operations can include update, insert, delete and move.

A partial comparison implies comparing two trees, level-by-level, from root to leaves as opposed to bottom-up approaches (i.e., leaves to root). A parsing technique can be implemented to determine each node's identity by location and depth within the tree structure, keeping both the location and depth confidential to the third part comparer. An exemplar parsing technique includes an EBOL-based, XML parsing technique, discussed in further detail below. Such parsing techniques enable nodes (e.g., XML nodes) to be edited independent of their hierarchy relationship. For example, any node can be deleted or moved irrespective of its children nodes.

Referring again to FIG. 3, nodes in a level of $T_X$ (e.g., level 1) are first compared with the nodes in the corresponding level of $T_Y$. The exemplar tree $T_X$ of FIG. 3 includes nodes $x_1, \ldots, x_2, x_3, x_4$ (i.e., j=4) in level 1 (i.e., l=1), respectively annotated as nodes 19, 35, 48 and 59. Level 2 (i.e., l=2) of exemplar tree $T_X$ of FIG. 3 includes nodes $x_1, x_2, x_3, x_4$ (i.e., j=4), respectively annotated as nodes 73, 82, 93 and 98. For purposes of illustration and clarity, the nodes of each level can be designated using the notation $x_{j,1}$ to better differentiate the nodes of level 1 (i.e., $x_{1,1}, x_{2,1}, x_{3,1}, x_{4,1}$) from the nodes of level 2 (i.e., $x_{1,2}, x_{2,2}, x_{3,2}, x_{4,2}$). The exemplar tree $T_Y$ of FIG. 3 includes nodes $y_1, y_2, y_3, y_4$ (i.e., j=4) in level 1 (i.e., l=1), respectively annotated as nodes 19, 53, 59 and 35. Level 2 (i.e., l=2) of exemplar tree $T_Y$ of FIG. 3 includes nodes $y_1, y_2, y_3, y_4$ (i.e., j=4), respectively annotated as nodes 73, 82, 93 and 98. For purposes of illustration and clarity, the nodes of each level can be designated using the notation $y_{k,1}$ to better differentiate the nodes of level 1 (i.e., $y_{1,1}, y_{2,1}, y_{3,1}, y_{4,1}$) from the nodes of level 2 (i.e., $y_{1,2}, y_{2,2}, y_{3,2}, y_{4,2}$). When comparing the trees $T_X$, $T_Y$, if any node of $T_X$ remains unmatched with a node in the corresponding level of the $T_Y$, other levels of $T_Y$ (e.g., level 2) can be considered to determine whether any appropriate match exists in $T_Y$. One level of a tree (e.g., $T_X$) is said to be isomorphic to a level of another tree (e.g., $T_Y$), if they are identical except for node names.

The tree $T_X$ can be transformed to a tree $T'_X$, which is provided as a level-wise isomorphic to $T_Y$ using a sequence of edit operations that incur the cheapest cost. As used herein, the term cheapest cost means the fewest number of edit operations. As $T_X$ is transformed to $T'_X$, appropriate matches between the nodes of $T'_X$ and $T_Y$ are determined. The MCES can be generated based on identifying these matches. In short, edit operations on XML trees and a corresponding edit operation cost model are defined. The resultant MCES algorithm is executed on the XML tree versions to provide the edited XML tree.

Referring now to FIGS. 4A-4E, an exemplar comparison between the tree $T_X$ and the tree $T_Y$ will be described, as well as the resultant MCES. In general, the tree $T_X$, identified as $T_0$ (see FIG. 4A), is transformed to $T'_X$ (see FIG. 4E), which is isomorphic to $T_Y$. $T'_X$ is considered to be isomorphic to $T_Y$, if they are identical except for node names. Intermediate trees $T_1, T_2, T_3, T_4$ ($T_4$ being the resultant tree $T'_X$) indicate the transformed trees resulting from respective edit operations. In the discussion below, a node's encrypted name value is indicated using $val_x$ or $val_y$, and an EBOL-based, parsed XML document is indicated as tree $T_i$. $T_{i+1}$ refers to the resulting tree after performing an edit operation on $T_i$.

The edit operations implemented in the exemplar comparison of FIGS. 4A-4E include an update operation, an insert operation, a delete operation, and a move operation. The update operation is performed to update the value of a node x in tree $T_i$, denoted as Upd(x,val), and leaves tree $T_{i+1}$ the same as tree $T_i$ except that the value of x is val in tree $T_{i+1}$. The insertion operation is performed to insert a new node x with a value v into tree $T_i$, denoted as Ins(x,v,k), which indicates that a node x with value v is inserted after a node k as its immediate right sibling node in tree $T_i$. In particular, if $r_1, \ldots, r_m$ are the right sibling nodes of node k, in that order in tree $T_i$, then $x, r_1, \ldots, r_m$ are the right sibling nodes of node k in tree $T_{i+1}$. The delete operation is performed to delete a node x from tree $T_i$, and is denoted as Del(x). The resulting tree $T_{i+1}$ is the same as tree $T_i$ without the node x. In particular, if $1_1, \ldots, 1_q, x, r_1, \ldots, r_m$ is the sibling node sequence in a level of $T_i$, then $1_1, \ldots, 1_q, r_1, \ldots, r_m$ is the sibling node sequence in $T_{i+1}$ after node x is deleted. The move operation is performed to move a node x to appear after a node y in tree $T_i$, and is denoted as Mov(x,y). Resultant tree $T_{i+1}$ is the same as tree $T_i$, except node x becomes the immediate right sibling of node y.

Consider the transformation $$T_0 \xrightarrow{s1} T_1,$$

where $T_1$ is the result of applying the edit operation $s_1$ to $T_0$. An edit script S can be developed as a sequence of edit operations that, when applied to $T_0$ transforms it to $T_i$. Given a sequence $S = s_1 \ldots s_i$ of edit operations, the transformation $$T_0 \xrightarrow{S} T_4$$

exists, if there exists $T_1, T_2, \ldots T_{i-1}$ such that $$T_0 \xrightarrow{s1} T_1 \xrightarrow{s2} T_2 \ldots T_{i-1} \xrightarrow{si} T_i.$$

For example, and as discussed in further detail below, edit script:

S={Upd(59,d'), Ins(53,19), Mov(59,53), Del(48)} is an edit script that transforms tree $T_X$ to tree $T_Y$ in FIG. 3.

There may be several edit scripts that transform tree $T_X$ into the same resulting tree $T_Y$. For example, the edit script:

S'={Del(59), Ins(59,d',48), Ins(53,n,19), Del(93), Del(98), Del(35), Ins(35,b,48), Ins(93,e,$b_e$), Ins(98,f,93), Del(48)} when applied to tree $T_X$ of FIG. 3, also transforms tree $T_X$ to tree $T_Y$. However, the edit script S' performs more work than that of S. Consequently, the edit script S, which can be deemed a MCES for the exemplar transformation, is preferred over the edit script S'. To determine a MCES, a cost model is implemented. The cost of an edit operation depends on the type of operation and the nodes involved in the operation. For purposes of illustration, $C_D(x)$, $C_I(x)$, $C_U(x)$, and $C_M(x)$ denote the costs of deleting, inserting, updating and moving operations, respectively. The cost may depend on the encrypted value represented by a node x and its position in the sibling order in a level. A simple cost model can be implemented, in which deleting, inserting, and moving a node are considered to be unit cost operations (i.e., $C_D(x) = C_I(x) = C_M(x) = 1$ for all nodes x). For the cost $C_U(x)$ of updating an encrypted value associated to a node x, a difference function, discussed in further detail below, is defined as Diff($val_x$, $val_y$) that returns a zero value, if encrypted values represented by $val_x$ and $val_y$ are same, and a non-zero value indicating that there has been an update.

Figure 4A:
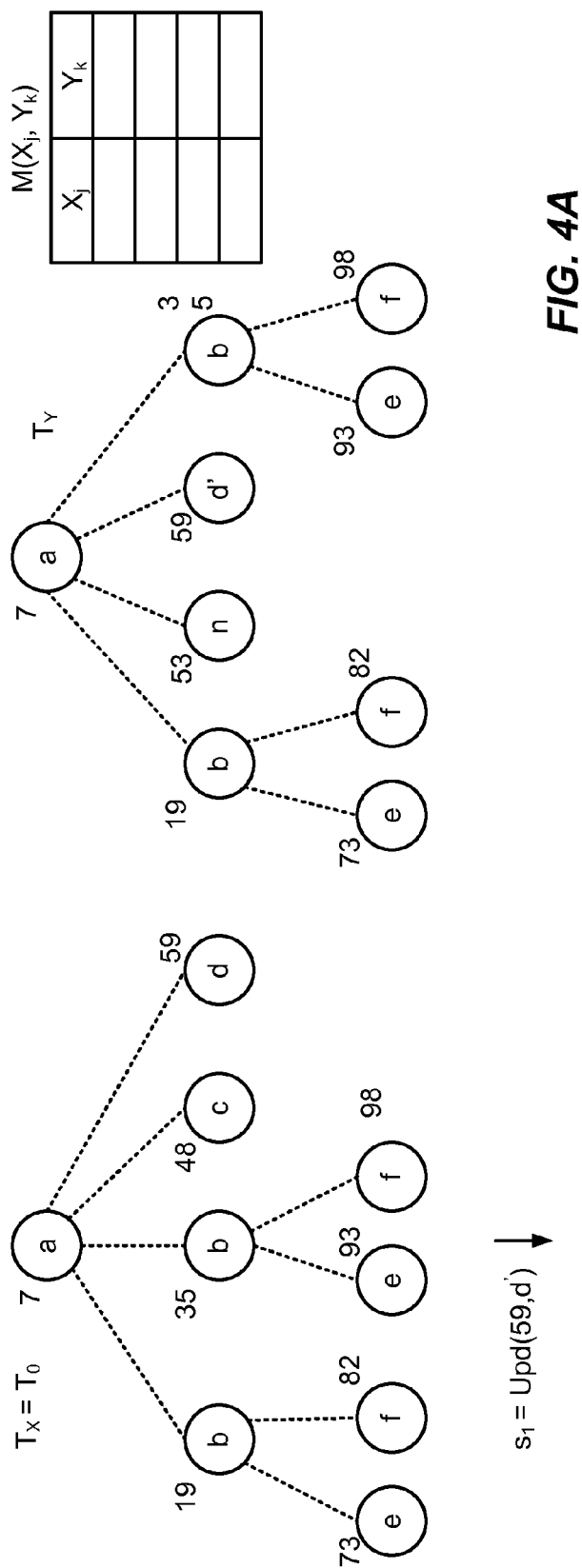
Figure 4B:
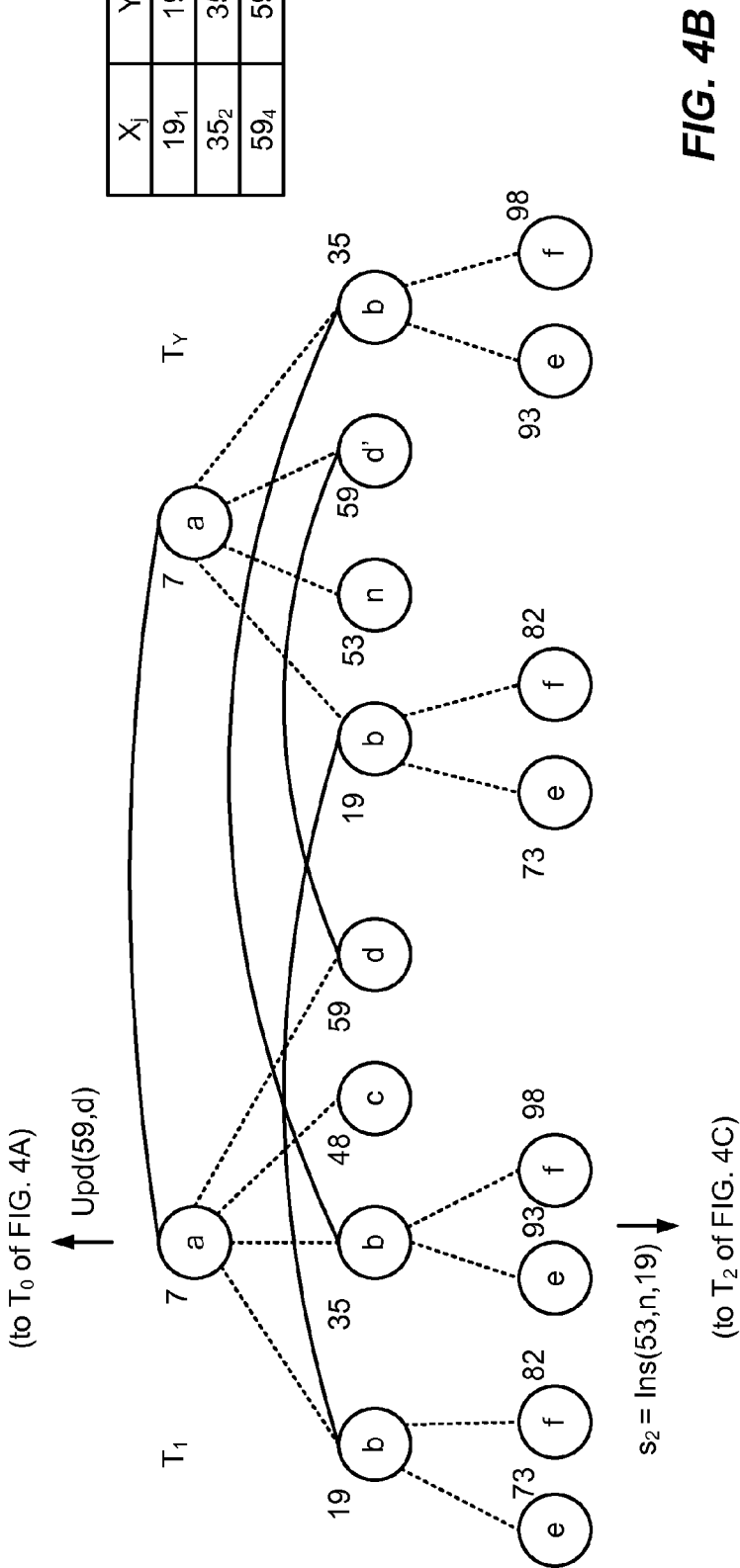

With particular reference to FIGS. 4A and 4B, an exemplar update operation for the transformation of tree $T_0$ (i.e., tree $T_X$) to intermediate tree $T_1$ will be described. For each node x of $T_0$, an exist function, discussed in further detail below, is invoked to determine whether node $x_i$ exists in tree $T_Y$. If node $x_i$ exists as node $y_i$ in tree $T_Y$, the function returns $val_y$, which is the value of the corresponding node $y_i$. The difference function, also discussed in further detail below, is called to determine whether there is a difference between the value of node $x_j$ in tree $T_0$ and the value of the corresponding, or matching node $y_k$ in tree $T_Y$. If a non-zero value is returned by the difference function, indicating that there is a difference between the values, an update operation, Upd(x, $val_y$), is added to a script S, and a matched pair, ($x_j$, $y_k$) is added to the set of matched pairs M, provided in a table. Consequently, the update operation can be applied to $T_0$ to transform $T_0$ to $T_1$ by assigning $val_x=val_y$ for each node x in tree $T_0$ that has a corresponding identifier in tree $T_Y$. If a zero value is returned by the difference function, indicating that there is no difference between the values, the matched pair, ($x_j$, $y_k$) is added to the set M.

In the exemplar scenario of FIG. 4B, an update operation, Upd(59,d'), when applied to tree $T_0$, transforms tree $T_0$ to tree $T_1$. When considering a reverse transformation (i.e., transforming tree $T_1$ to tree $T_0$), an update operation, Upd(59,d) can be applied to $T_1$ to transform tree $T_1$ to tree $T_0$. The table of FIG. 4B provides all of the matching node pairs in M as between the trees $T_0$ and $T_Y$.

With particular reference to FIGS. 4B and 4C, to determine whether there are any nodes that have been inserted into tree $T_Y$, nodes y of tree $T_Y$ are considered, where y is not a peer in any of the matched pairs in the set M. For each node y that is identified, a corresponding insert operation, Ins(y, $val_y$, K), is added to the script S, indicating that node y will be inserted after node x in $T_X$ with the encrypted value $val_y$. The position K is determined with respect to the sibling position of already matched pairs of the set M. In particular, the peer node $x_i$ of $T_X$ in M($x_j$, $y_k$), for which node y is the immediate right sibling of $y_k$, is the node x in $T_X$. Accordingly, the insert operation is applied to tree $T_X$, and the node pair, ($x_{j+1}$, $y_{k+1}$) is added to the set M. If node y is the first sibling in $T_Y$ (i.e., left-most child), then node x is considered to be a dummy child node of the level in question of $T_X$. In effect, the insert operation changes the sibling positions of existing peer nodes of $T_X$ in the set M.

In the exemplar scenario of FIG. 4C, an insert operation, Ins(53,n,19), is applied to tree $T_1$ to transform tree $T_1$ to tree $T_2$. When considering a reverse transformation (i.e., transforming tree $T_2$ to tree $T_1$), a delete operation, Del(59) can be applied to tree $T_2$ to transform tree $T_2$ to tree $T_1$. The delete operation is discussed in further detail below. The set of matched pairs M is updated to include the inserted node, as seen in the table of FIG. 4C.

Figure 4D:
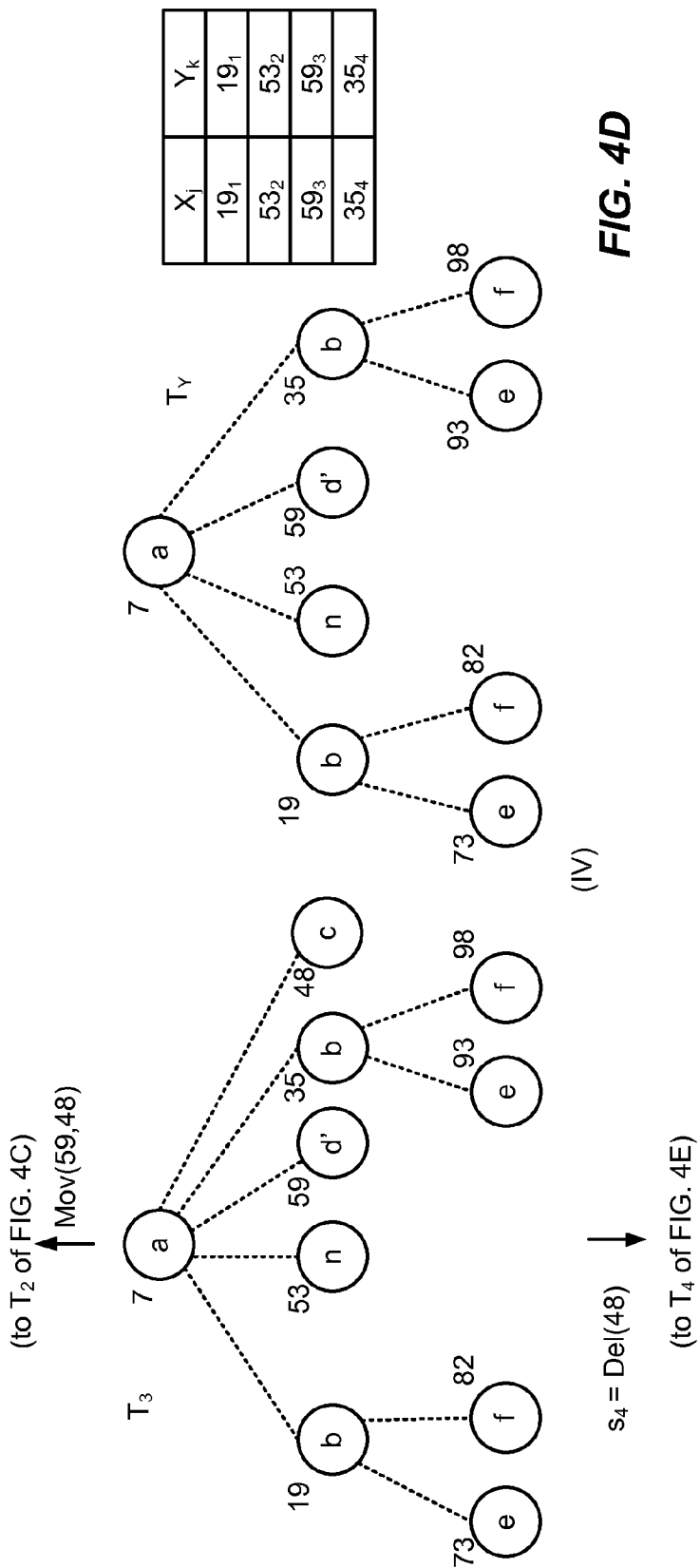

With particular reference to FIGS. 4C and 4D, the pairs of set M are analyzed to determine which peer node's sibling positions are not the same as between tree $T_2$ and $T_Y$. In the exemplar scenario of FIG. 4C, nodes 35, 59 in $T_2$ are miss arranged with respect to their respective sibling positions in $T_Y$ as depicted in the set M. A move operation can be added to the script S to arrange the sibling order of $T_2$. In particular, a Mov(59, 53) operation is added to the script S, and is applied to tree $T_2$ to transform tree $T_2$ to tree $T_3$ (see FIG. 4D). No new match pair is identified as a result of the move operation, however, the sibling positions are changed as depicted in the table of FIG. 4D. When considering a reverse transformation (i.e., transforming tree $T_3$ to tree $T_2$), a move operation, Mov (59,48), can be applied to $T_3$ to transform tree $T_3$ to tree $T_2$.

Figure 4E:
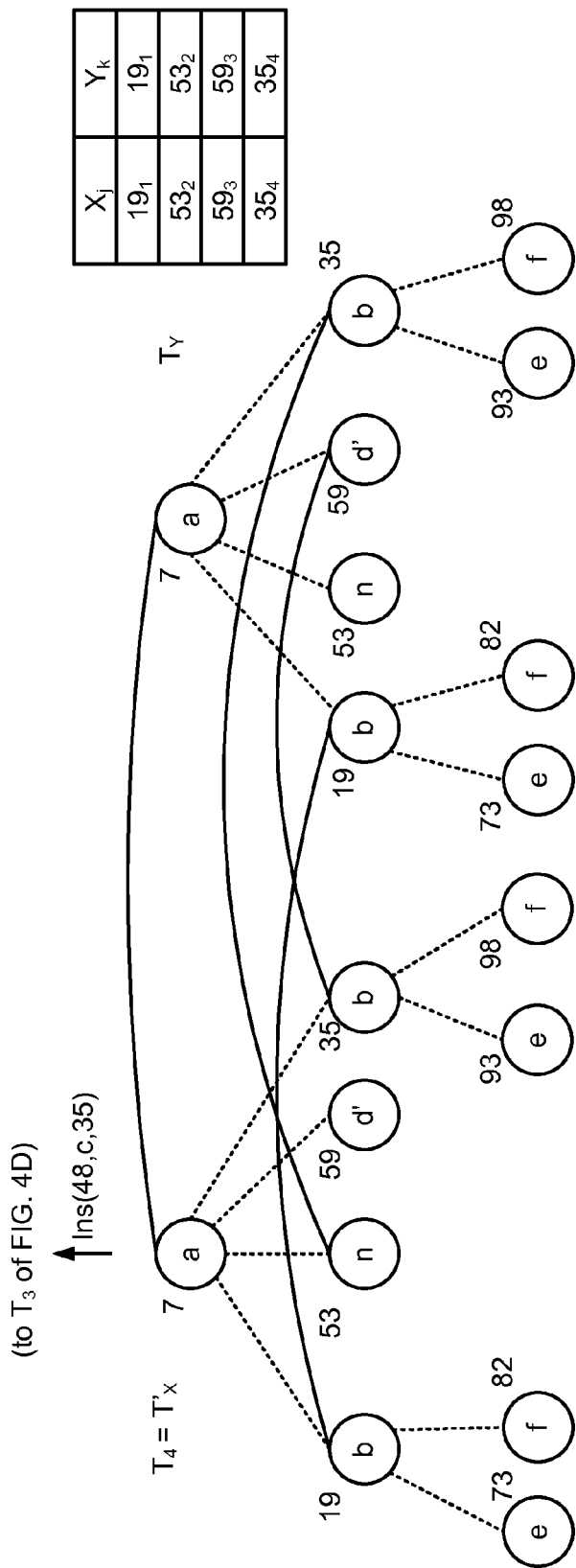

With particular reference to FIGS. 4D and 4E, to find the deleted nodes of tree $T_X$, as compared to tree $T_Y$, the nodes x in tree $T_X$ are considered, such that a node x is not a peer in any of the pairs in the set M. For each such node x, it is either deleted from the level it was in (i.e., in tree $T_X$), or it is moved to another level. For partial comparison purposes, discussed above, the former can be concluded. Consequently, a delete operation, Del(x), can be added to the script S, which in turn changes the existing sibling positions in the set M. FIG. 4E provides the resulting tree $T_4$ after performing Del(48) on tree $T_3$. When considering a reverse transformation (i.e., transforming tree $T_4$ to tree $T_3$), an insert operation, Ins(48,c,35), can be applied to $T_4$ to transform tree $T_4$ to tree $T_3$.

As a result of the operations of the exemplar transformation provided in FIGS. 4A-4E, a multi-step edit script S is provided and is represented as:

S={Upd(59,d'), Ins(53,19), Mov(59,53), Del(48)}

After applying the edit script S, the first level of the initial tree $T_0$ is transformed to $T_4$, which is isomorphic to $T_Y$ with respect to the first level. Accordingly, S is the final edit script conforming to the first level, and the set M contains the matched pairs nodes of that level. The operations provided above can be executed for each additional level of the trees to be compared to develop a multi-step edit script for each level. The multiple scripts can be combined into a single overall script describing the complete transformation of tree $T_X$ to tree $T_Y$ for all levels.

Figure 5:
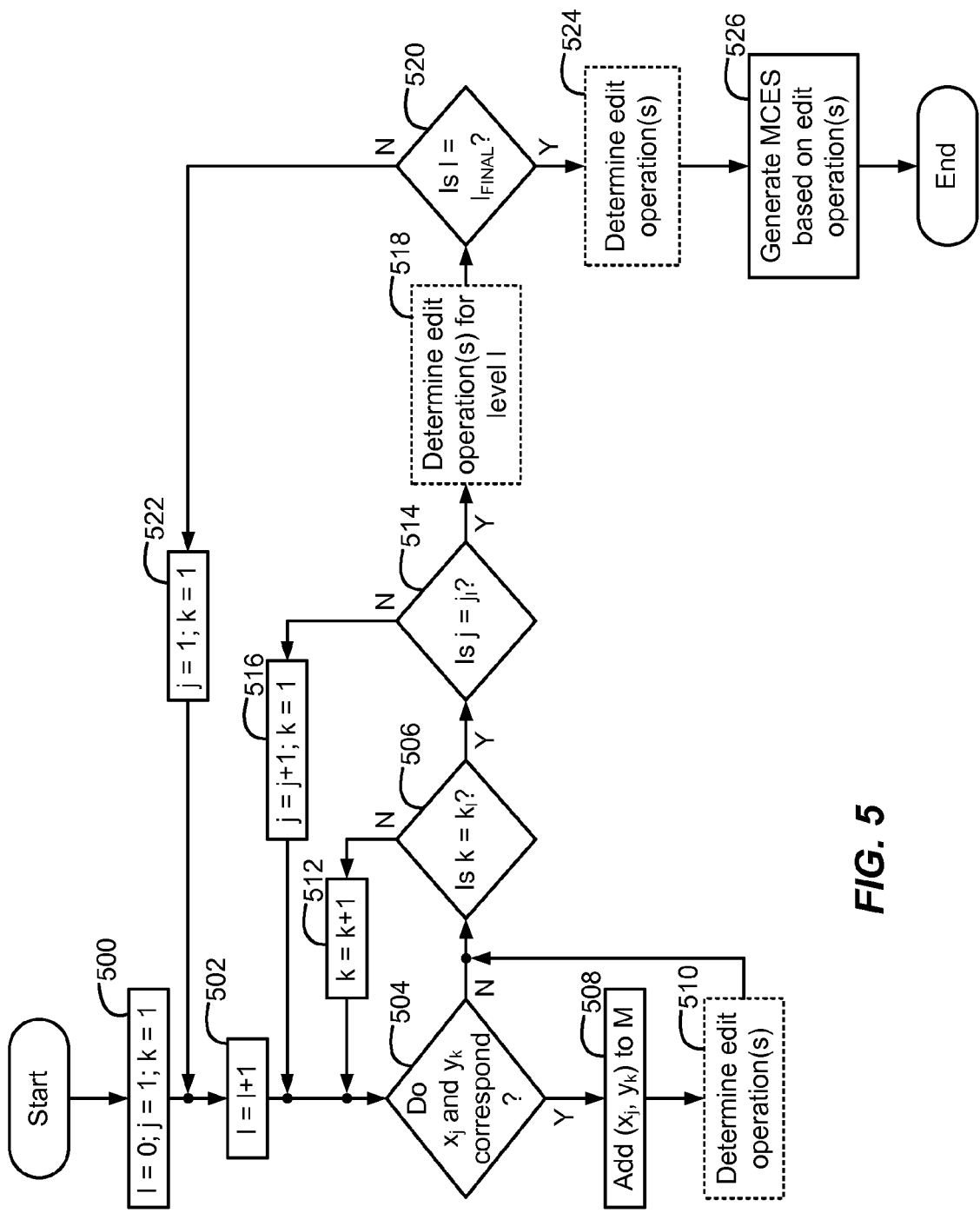
FIG. 5 is a flowchart illustrating exemplar steps that can be executed to generate a minimum cost edit script for transforming an initial data structure to an edited data structure.

Referring now to FIG. 5, an exemplar process including a plurality of steps that can be executed will be discussed in detail. The steps of FIG. 5 can be executed to generate a MCES using, for example, one or more processors (e.g., one or more processors of the computing systems 102, 104 and/or 106). In step 500, a counter 1 is set equal to zero (i.e., 1=0), a counter j is set equal to 1 (i.e., j=1) and a counter k is set equal to 1 (i.e., k=1). In step 502, the counter 1 is incremented by one. In step 504, it is determined whether a node $x_j$ of a first tree corresponds to a node $y_k$ of a second tree. If nodes $x_j$ and $y_k$ do not correspond, the steps continue at step 506. If nodes $x_j$ and $y_k$ correspond, the steps continue at step 508. The node pair ($x_j$, $y_k$) is added to M in step 508. In step 510, edit operations can be determined, and the steps continue at step 506. As discussed in further detail herein, the edit operations can be determined at various stages of the process. Consequently, step 510 is illustrated as an optional step by dashed lines.

In step 506, it is determined whether the counter k has achieved $k_1$ (i.e., the total number of nodes for level 1 in the second tree). If the counter k has not achieved $k_l$, the counter k is incremented by one in step 512, and the steps loop back to step 504. If the counter k has achieved $k_1$, it is determined whether the counter j has achieved $j_1$ (i.e., the total number of nodes for level 1 in the first tree) in step 514. If the counter j has not achieved $j_1$, the counter j is incremented by one and the counter k is set equal to one in step 516, and the steps loop back to step 504. If the counter j has achieved $j_1$, edit operations can be determined in step 518, and the process continues in step 520. As discussed in further detail herein, the edit operations can be determined at various stages of the process. Consequently, step 518 is illustrated as an optional step by dashed lines.

In step 520, it is determined whether 1 has achieved $1_{FINAL}$ (i.e., the total number of levels in the first and second trees). If 1 has not achieved $1_{FINAL}$, the counters j and k are each set equal to one in step 522, and the steps loop back to step 502. If 1 has achieved $1_{FINAL}$, the edit operations can be determined in step 524, and the steps continue in step 526. As discussed in further detail herein, the edit operations can be determined at various stages of the process. Consequently, step 524 is illustrated as an optional step by dashed lines. In step 526, the MCES is generated based on the determined edit operations (i.e., determined in step 510, 518 or 524) and the process ends.

Figure 6A:
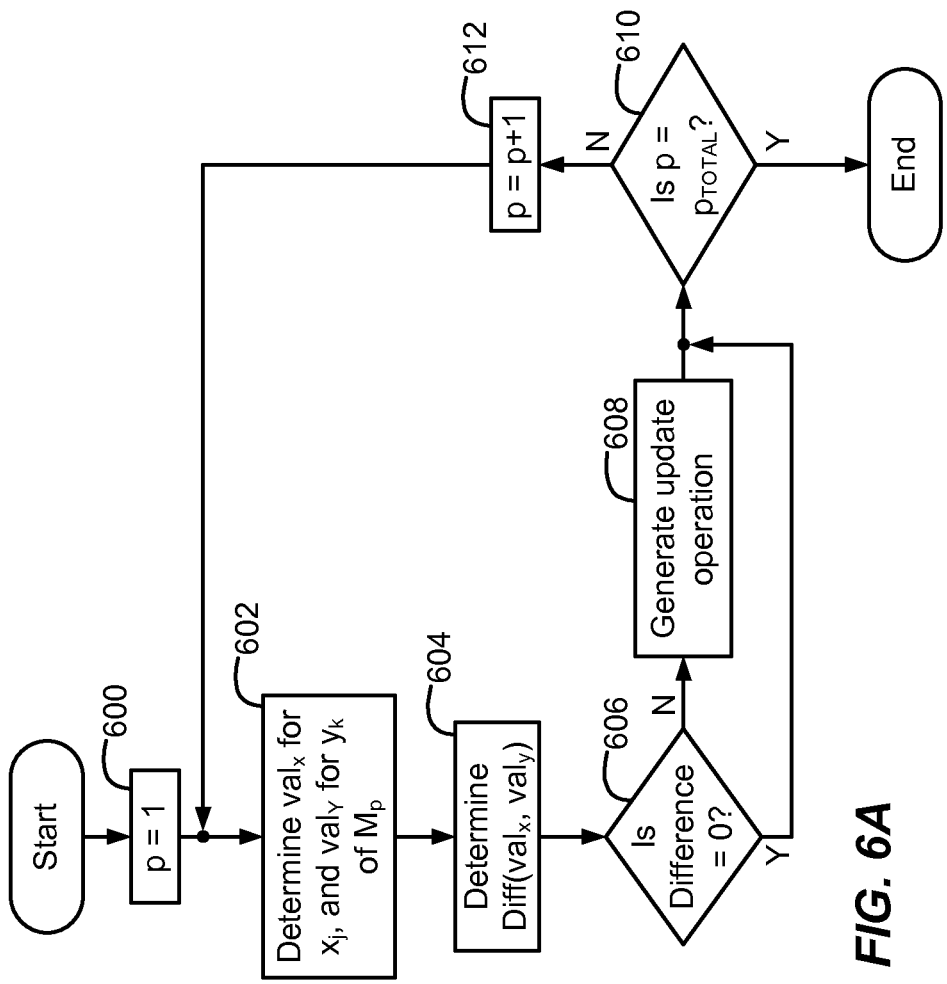
FIGS. 6A-6D include a flowcharts illustrating exemplar steps that can be executed to determine edit operations to be included in the minimum cost edit script.

Referring now to FIGS. 6A-6D, exemplar processes including a plurality steps that can be executed will be discussed in detail. The steps of FIGS. 6A-6D can be executed to determine respective edit operations using, for example, using one or more processors (e.g., one or more processors of the computing systems 102, 104 and/or 106). With particular reference to FIG. 6A, an exemplar process is illustrated for determining whether an update operation is to be generated. In step 600, a counter p is set equal to one (i.e., p=1). In step 602, $val_x$ for $x_j$ and $val_y$ for $y_k$ of the matched pair $M_p$ are determined. In step 604, the result of Diff($val_x$, $val_y$) (i.e., the difference between $val_x$ and $val_y$) is determined.

In step 606, it is determined whether the difference is equal to zero. If the difference is not equal to zero, the steps continue in step 608. If the difference is equal to zero, the steps continue in step 610. In step 608, an update operation is generated to update $val_x$ of $x_j$ to be set equal to $val_y$ of $y_k$, which update operation is to be included in the MCES. In step 610, it is determined whether the counter p is equal to $p_{TOTAL}$ (i.e., the total number of matched pairs in the set M). If the counter p is not equal to $p_{TOTAL}$, the counter p is incremented by one in step 612, and the steps loop back to step 602. If the counter p is equal to $p_{TOTAL}$, the steps end.

Figure 6B:
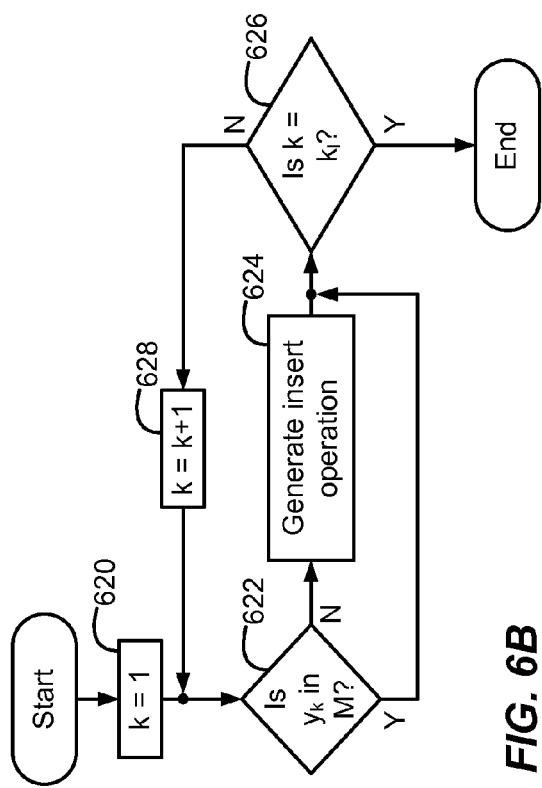

With particular reference to FIG. 6B, an exemplar process is illustrated for determining whether an insert operation is to be generated. In step 620, a counter k is set equal to one (i.e., k=1). In step 622, it is determined whether the node $y_k$ of the second tree is present in the matched pairs of the set M. If $y_k$ is not present in the matched pairs of set M, the steps continue in step 624. If $y_k$ is present in the matched pairs, the steps continue in step 626. In step 624, an insert operation is generated to insert an equivalent node $y_k$ into the first tree, which insert operation is to be included in the MCES. In step 626, it is determined whether the counter k is equal to $k_1$. If the counter k is not equal to the counter k is incremented by one in step 628, and the steps loop back to step 622. If the counter k is equal to $k_1$, the steps end.

Figure 6C:
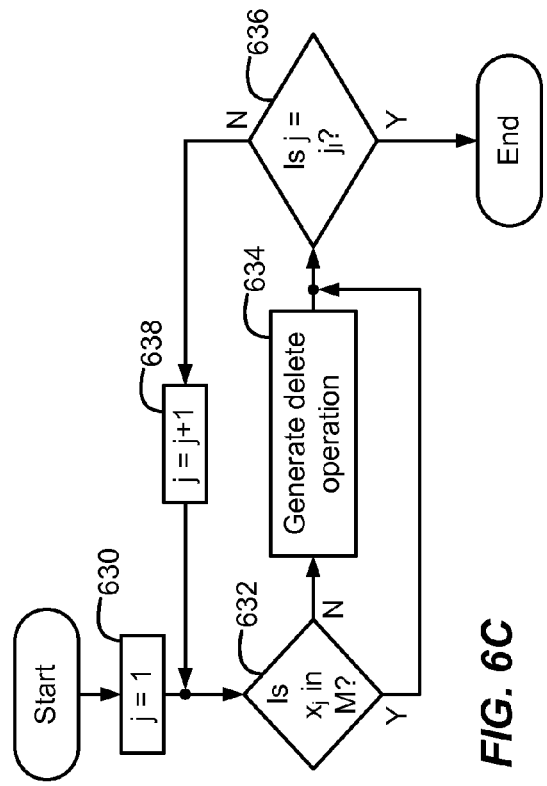

With particular reference to FIG. 6C, an exemplar process is illustrated for determining whether a delete operation is to be generated. In step 630, a counter j is set equal to one (i.e., j=1). In step 632, it is determined whether the node $x_j$ of the first tree is present in the matched pairs of the set M. If $x_j$ is not present in the matched pairs of set M, the steps continue in step 634. If $x_j$ is present in the matched pairs, the steps continue in step 636. In step 634, a delete operation is generated to delete the node $x_j$ from the first tree, which delete operation is to be included in the MCES. In step 636, it is determined whether the counter j is equal to $j_1$. If the counter j is not equal to $j_1$, the counter j is incremented by one in step 638, and the steps loop back to step 632. If the counter j is equal to $j_1$, the steps end.

Figure 6D:
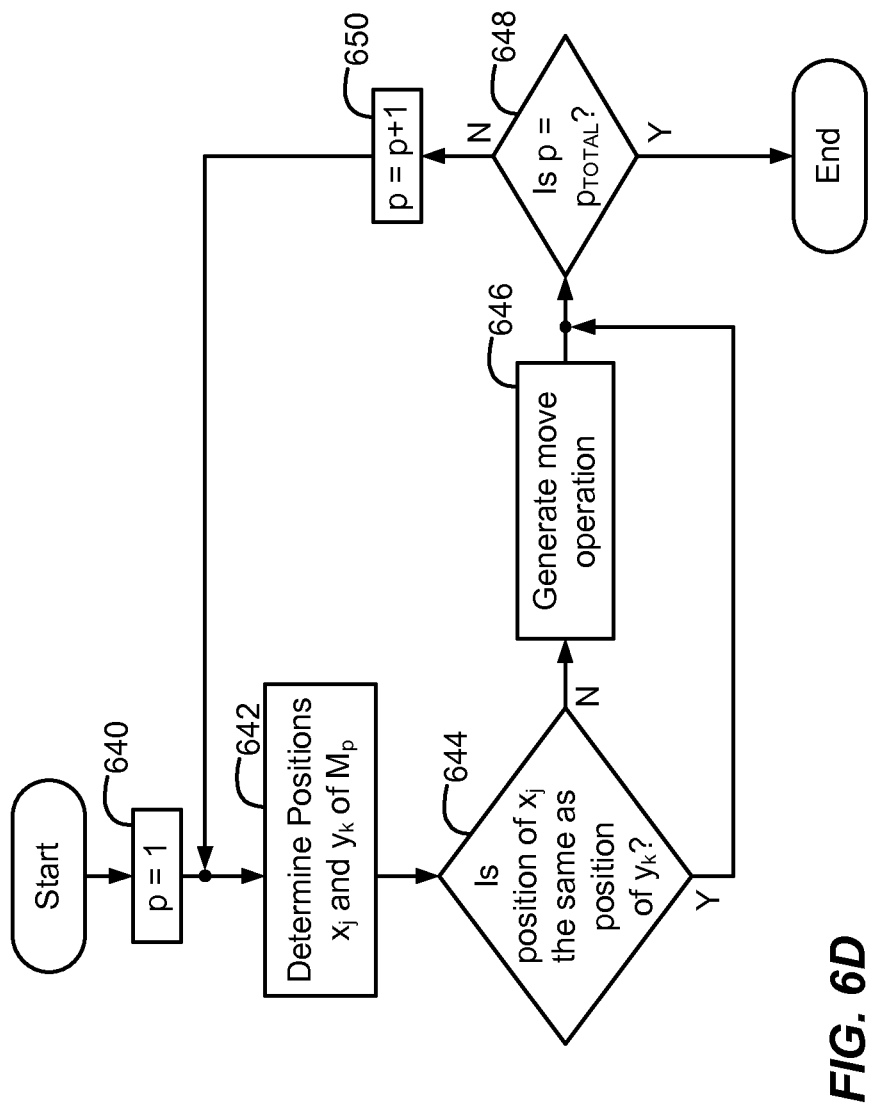

With particular reference to FIG. 6D, an exemplar process is illustrated for determining whether a move operation is to be generated. In step 640, a counter p is set equal to one (i.e., p=1). In step 642, the positions of $x_j$ and $y_k$ of the matched pair $M_p$ within the first and second trees, respectively, are determined. In step 644, it is determined whether the position of $x_j$ within the first tree (e.g., $T_X$) is the same as the position of $y_k$ within the second tree (e.g., $T_Y$). If the position of $x_j$ is the same as the position of $y_k$, the steps continue in step 646. If the position of $x_j$ is not the same as the position of $y_k$, the steps continue in step 648. In step 646, a move operation is generated to move the node $x_j$ to be in the same position as the node $y_k$, which move operation is to be included in the MCES. In step 648, it is determined whether the counter p is equal to $p_{TOTAL}$ (i.e., the total number of matched pairs in the set M). If the counter p is not equal to $p_{TOTAL}$, the counter p is incremented by one in step 650, and the steps loop back to step 642. If the counter p is equal to $p_{TOTAL}$, the steps end.

The algorithms underlying the processes of FIGS. 5 and 6A-6D, consider the trees $T_X$, $T_Y$, and use a plurality of other functions including the Exist function, an ArrangeSibling function, an UpdateMatch function, and a FindSibling function. All of the edit cases are combined in one breadth, first traversal of trees $T_X$, $T_Y$. It is assumed that a multi-threading control mechanism disallows updating of the set M and the script S by an edit operation, while they are being updated by another edit operation. An exemplar Exist function is provided as:

Function Exist($x_j$, $y_k$, U, M)
(a) if (U) then for each node $y_k \in 1(T_Y)$; /*update case*/ do
if $E_Y = E_X$ return $val_y$; else return NULL; endfor
(b) if (M) then for each node pair $\in M$
if $y_k \in M$; return true; /*insert case*/
if $x_j \in M$; return true; /*delete case*/

The function Exist($x_j$, $y_k$, U, M) is called from update, insert, and delete operations. For update $x_j$, U, for insert $y_k$, M, and for delete $x_j$, M are filled in. For the update operation, the nodes in $1(T_X)$ are compared. For the insert and delete operations, the node pairs in the set M are compared.

Each edit operation generates the matching node pairs and preserves the current sibling order of $T_X$ in the set M by invoking the function UpdateMatch function. An exemplar UpdateMatch function is provided as:

Function UpdateMatch((xj, xk, editcase))
q, t, u, v are integers
(a) if (editcase=Update) then M[q]=($x_j$, $y_k$), such that $\forall$ t, $0<t<q$; M[t]=($x_u$, $y_v$) and $j>u$ /*adding pair nodes in M*/
(b) if (editcase=Insert) for each pair M[q]=($x_u$, $y_v$), such that $u>j$, do M[q+1]=($x_u$, $y_v$). end for M[i]= ($x_j$, $y_k$)/*updating sibling position*/
(c) if (editcase=Delete) for each right sibling node, $x_{u>i}$, of $x_i$, such that ($x_u$, $y_v$) $\in M$ do/*updating sibling position*/
Replace u with u−1; i.e., ($x_{u-i}$, $x_v$)=($x_u$, $y_v$). endfor For the insert operation, the UpdateMatch function inserts the new pair in the right position by moving the existing pairs. For the delete operation, the UpdateMatch function updates the sibling position of the pair in M according to the sibling position of $T_X$. The move operation invokes the UpdateMatch function with the delete or insert parameter when a node is moved to the right or to the left, respectively.

The insert and move operations invoke the FindSibling function to determine the node, after which node it should insert or move. An exemplar FindSibling function is provided as:

Function FindSibling($y_k$)
for each ($x_j$, $y_k$) $\in M$
if ($y_m$ is the right sibling of $y_k$) return $x_j$. /*left peer node*/

The ArrangeSibling function computes the longest sibling sequence (LSS) and returns the nodes of $T_x$ to be moved when invoked by the move operation. An exemplar ArrangeSibling function is provided as:

Function FindSibling($L_x$, $L_y$)
Compute $L_{xy}$=LSS($L_x$, $L_y$), return $\forall$ x $\in L_{xy}$; /*miss arranged peer node*/

Detecting techniques of changes in sanitized tree structured data by a third party may be used in many service-oriented architecture (SOA) and database applications. Such applications can include integration application, XML database aggregation applications, and versioning/merging applications. In an exemplar integration application, WSDL documents offered by competing organizations can be compared. Any change of service operations (e.g., a new service operation, or a removed service operation) occurring in an SOA-based business process can be immediately identified. In an exemplar aggregation application, similarities between different XML databases can be determined, enabling efficient aggregation. In an exemplar versioning/merging application, different versions of encrypted documents can be managed in version management systems. Differences between two encrypted documents are captured as an MCES, and a version of the comparing documents can be stored into the system. In this manner, other version can be generated whenever required.

Another exemplar application includes controlled outsourcing of business functionalities, such as in the pharmaceutical industry, for example. In the case of clinical trial studies, specialized companies offer services (e.g., data analysis) to the organizations conducting clinical trials. All stakeholders have an interest in detecting changes to service descriptions and type definitions, for example. Further, when actual data sets are passed between the services and organizations, any kind of deviation or change to data structures may be monitored by parties, even if they are only indirectly involved in the data exchange. For example, though some change to a data structure does not relate to a specific trial method, it needs to be recorded in case the trial shows any anomalies.

Referring now to FIGS. 7-10, the increasing standardization of XML processing standards (e.g., XML Schema (XSL)) enables peer organizations to cooperate and integrate their information systems through XML document exchanges. As these documents tend to be large (e.g., enterprise XML documents), an efficient parsing technique should consider memory constraints. Furthermore, such document exchanges should be secured. For example, to prevent the distribution of sensitive parts of documents and their integrity violation by unauthorized parties, as well as to prevent the disclosure of the information system structure, which is generally closely tied to organizational business processes. Memory usage is a consideration, because tree structured data, such as XML documents, consume memory space not only for the nodes, but also for their hierarchy relationship. For example, an empty element <e/> (e.g., 4 bytes for the source file) could easily take 200 bytes of tree storage for these 4 bytes of source with empty information.

Implementations of the present disclosure provide a parsing technique for enterprise XML documents that addresses both memory utilization and security, where enterprise XML documents include large XML documents involved in executing business processes that leverage a wide range of enterprise applications (e.g., enterprise resource planning (ERP), supply chain management (SCM) and/or customer relationship management (CRM) applications).

Figure 7:
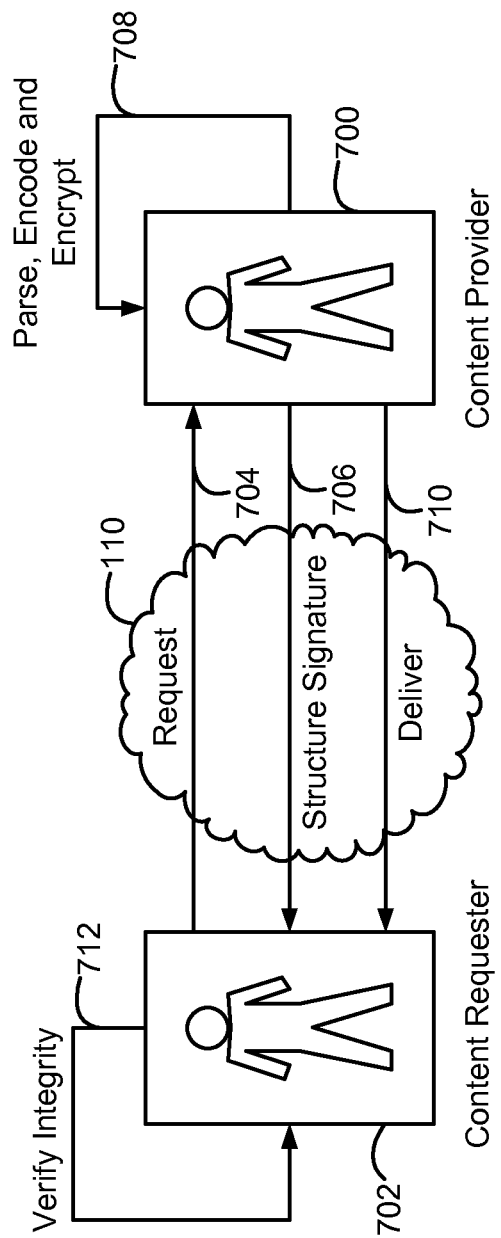
FIG. 7 is a block diagram illustrating an exemplar interaction between a content provider and a content requestor.

With particular reference to FIG. 7, an enterprise XML content provider has one or more authorized subscribers 702 (i.e., content requesters). The delivery of documents complies with certain authorization policies, and the content provider 700 and the content requester 702 share a secret key. When a new document is produced by the content provider 700, it is to be sent to the authorized content requesters 702. The content provider 700 selectively sends encrypted and structurally encoded XML document fragments to authorized content requesters 702 over an insecure communication channel, such as the network 110 of FIG. 1 (e.g., the Internet). In some situations, one or more adverse parties (attackers) might control communication channels to a content requester 702. Consequently, the integrity of the XML document content and its structure should be protected. The following characteristics are common for such a scenario:

Selective delivery: a content requester should only be provided with that document portion that he is authorized to access;

Confidentiality: the content should only be readable by legitimate content requesters 702;

Integrity: the integrity verification technique for the received content should accurately detect any compromise to the content (e.g., unintended updates, deletion, order changes of nodes, moves, swap); and Memory efficiency: the above-described characteristics and resulting measures (e.g., encryption, encoding, integrity checks) should be performed in a memory efficient manner to ensure a solution that scales.

For any enterprise XML processing in an enterprise application (e.g., ERP, SCM, CRM), the related document part is loaded in memory for useful processing. XML documents can be parsed using tree and/or event based parsing. The document object model (DOM), and the simple application program interface (API) for XML (SAX) are standard APIs for tree based and event based processing, respectively. With respect to memory space and processing time, event based parsing (e.g., SAX) outperforms DOM. However, if document updates (e.g., adding elements, attributes, or changing them) are required frequently, DOM is better than event based parsing, because the DOM API preserves the hierarchical structure of the XML documents.

As discussed above, an XML document includes multiple levels of XML nodes, which can include XML element tags, attributes, text content, where nodes having the same depth are positioned in the same level. Implementations of the present disclosure use a hybrid technique of tree and event based parsing, discussed above as EBOL parsing. In particular, a document tree is parsed by storing one level of nodes in a first-in, first-out (FIFO) queue, then immediately freeing the memory required for the hierarchy relationships of nodes. Consequently, less memory is required and updates in one level of nodes are enabled. The EBOL-based encoding also enables protecting the integrity and confidentiality of XML content.

Referring again to FIG. 7, multiple phases are illustrated and include a subscription phase, in which a content requester 702 sends a request 704 for a particular XML document portion (e.g., subtree or a node) together with the content requester's credentials to a content provider 702. Upon successful evaluation of the content provider's authorization policy, a structure signature is sent to the authorized content requester 706. The structure signature is subsequently used to verify the integrity of the received XML content. In a processing phase, the content provider 700 parses, encodes and encrypts 708 the XML document. In a delivery phase, the encrypted XML document (or a portion thereof), along with its encoding, is delivered 710 to the previously authenticated and authorized content requester 702. Upon reception, the content requester 702 verifies 712 the integrity of the received content by comparing the content with structure signature received in a validation phase.

Figure 8:
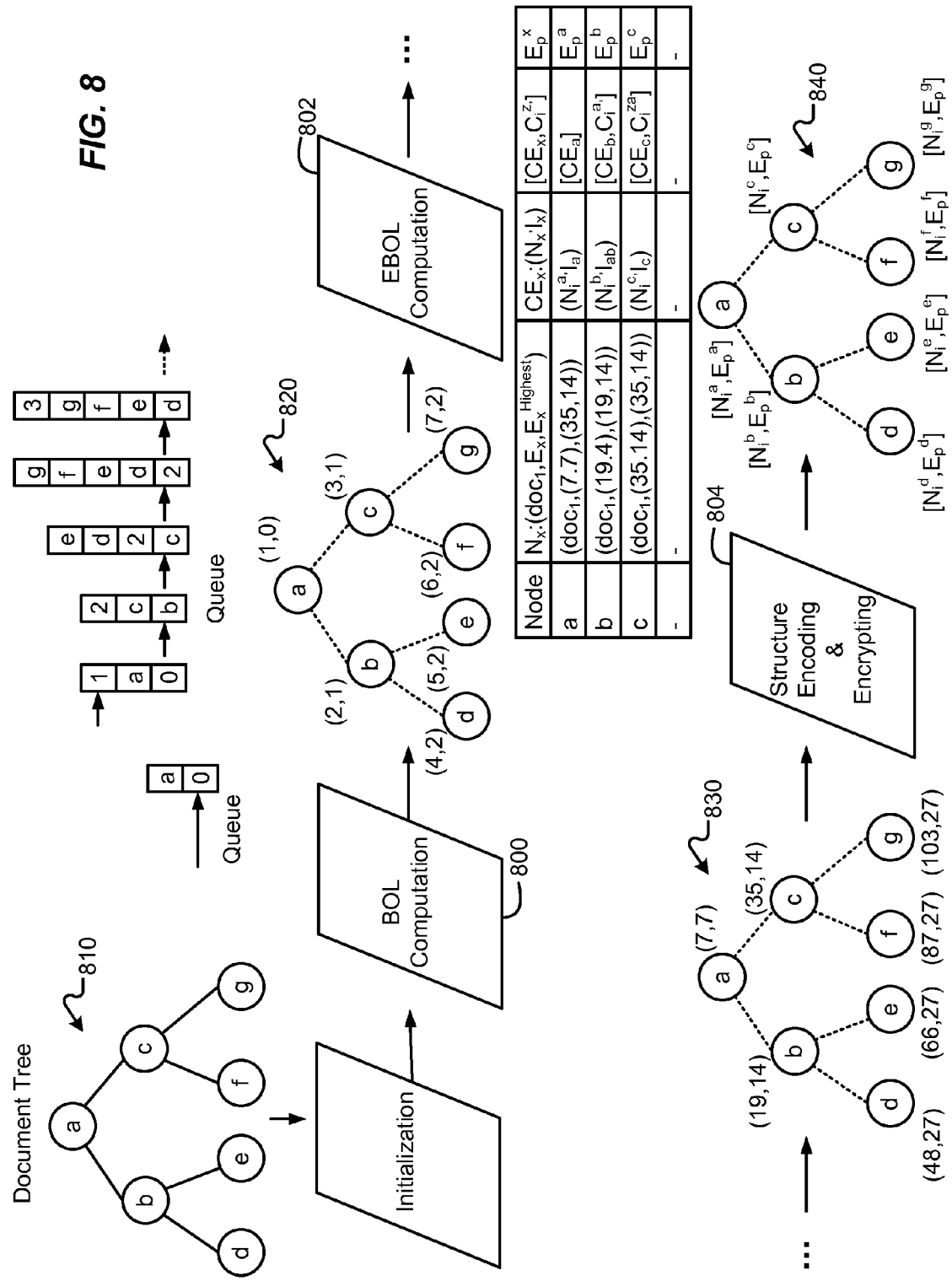
FIG. 8 is a block diagram illustrating an exemplar encryption-based processing in accordance with implementations of the present disclosure.

Referring now to FIG. 8, an implementation of a process for parsing, encoding and encrypting an XML document 810 (or portion thereof) will be described. The XML document 810 is traversed in breadth first order and an integer pair denoted as BOL (id, 1) is computed and assigned at 800 to each parsed XML node, where id is a unique integer and 1 is the depth of the node. A first intermediate document tree 820 results. The BOL (id, 1) is encrypted at 802 to generate an encrypted BOL (EBOL) with the content provider's chosen key. A second intermediate document tree 830 results, in which the original identity of the node and its depth location are not disclosed even to the authorized content requesters 702. Structure encoding information (SE) is determined for each node and each node is encrypted at 804 using a shared secret key between the content provider 700 and the content requester 702. An encrypted, or sanitized document tree 840 results.

Figures 9, 10:
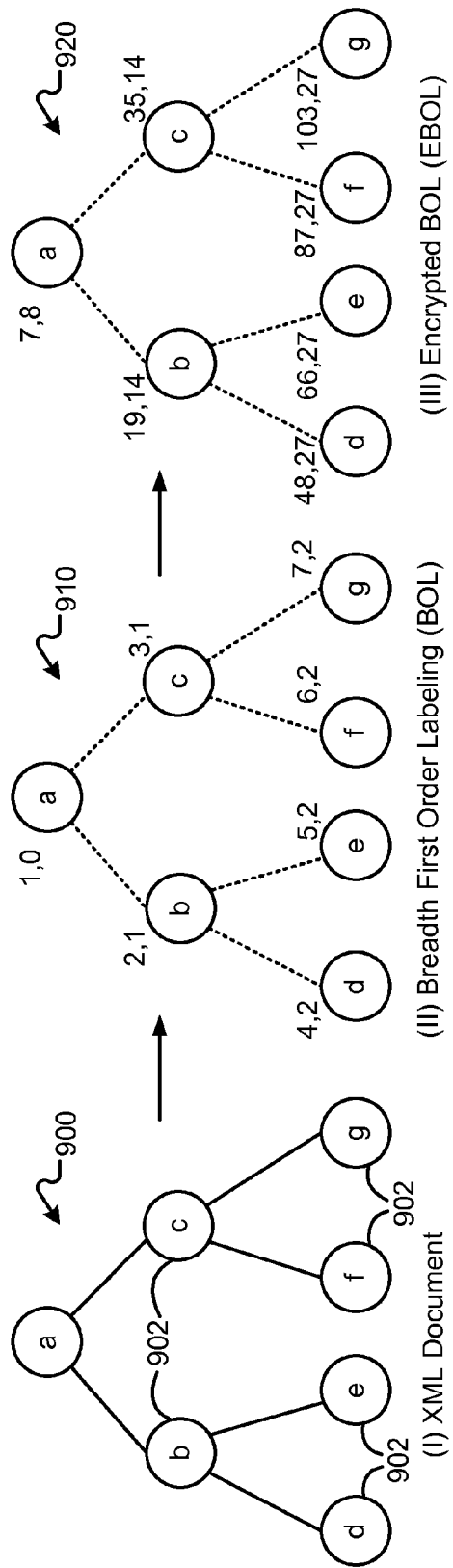
FIG. 9 is a block diagram illustrating an exemplar first order labeling of a data structure.
FIG. 10 is a table illustrating an exemplar encoding and encryption of nodes of the data structure of FIG. 9.

Referring now to FIGS. 9 and 10, processing of an exemplar enterprise XML document will be described. An XML document 900, identified as $doc_d$ (e.g. URI, RDF) includes a collection of parsed XML nodes 902, and a document portion $d_i$ is a sub-tree rooted at node i of document 900. The XML document 900 can include multiple levels of tree nodes 902, where nodes 902 that have the same depth are positioned in the same level. An enterprise XML processing model of content providers is provided below by introducing the breadth-first order labeling (BOL), their properties and usage for integrity protection. An XML node's structure encoding technique is provided, which tags the parsed node (using EBOL) with its structural information.

With particular reference to FIG. 9, nodes of a tree level can be stored in a FIFO queue without storing their hierarchy relationship. For example, for each SAX event (e.g., startElement) of an XML node, a DOM API can be used to get all the children of that node and store those nodes in a FIFO queue. Document updates can be performed in one level of nodes that are stored in the FIFO queue. An integer pair can be associated with a node of each level from left to right starting from the initial level (i.e., level zero, l=0). For each such node, the child nodes in a FIFO queue can be associated with an integer pair as the node are fetched from the FIFO queue. The integer pair captures various structural properties without consuming any memory footprint for hierarchical relationships (e.g., parent-child, siblings, left/right child) of the parsed node. An encryption over the integer pairs is performed to encode the original structural information (e.g., location, depth, number of nodes).

A BOL is a pair of integers associated with a node as it is parsed in breadth first order. The first integer in the integer pair is the order associated with a node whose left siblings and ancestors have already been parsed and have associated BOLs. The second integer in the integer pair is the depth of the node in the document, which depth integer is increased by one as a new depth level is reached. For example, a BOL associated document 910 can be developed from the document 900. The BOL starts with (1,0) as illustrated in FIG. 9. Although the exemplar document of FIG. 9 is provided as a binary tree, BOLs can be defined on any type of tree.

The node a of FIG. 9 is the parent of two nodes b, c $\in d_i$. The BOL of node a can be provided as $B_a$. Two functions that operate on a BOL can be provided as $f_{order}$ and $f_{level}$, which return the BOL order (i.e., the first attribute of the BOL pair) and the BOL depth (i.e., the second attribute of the BOL pair), respectively. For purposes of illustration, node b can be considered as the last parsed node and the node c is the next to be parsed node. The node c will be associated a BOL with the first attribute $f_{order}(B_c)=f_{order}(B_b)+1$. Accordingly, $f_{level}(B_c)$ uniquely identifies the depth level of the node c in the document 910. The order of the BOL exhibits the following structural properties: $f_{order}(B_a)$ uniquely identifies node a in the document 910 and the subtree $d_a$ rooted at node a; by defining $B_H^a$ be the largest BOL order of a parsed node in document portion $d_a$, then $B_H^a > f_{order}(B_z) > f_{order}(B_a)$, where z $\in d_a$; and $f_{order}(B_c) > f_{order}(B_b) > f_{order}(B_a)$.

The first property is used to identify and extract a specific document portion from a document. In combination with the depth level of a node, the first property ensures that any unexpected move, copy or replace activity in the document is detected. The second property imposes an upper bound on the BOL of any queried node parsed in a document. Accordingly, the second property enables detection of whether a node is added or deleted. The third property enables detection of any unintended swapping among the nodes in a received document portion (e.g., subtree).

With continued reference to FIG. 9, and by way of non-limiting example, the BOL of node c is a pair of an integer 3 and its depth level 1 (document 910 of FIG. 9). The first integer is a unique integer associated with c, and the nodes a, b are associated with smaller integers (i.e., 1, 2) than that of c, respectively. The second integer represents the depth level of node c in the document 910. The largest BOL of c (i.e., $B_H^c$) in the document portion rooted at node c is the BOL of the node g (i.e., (7, 2)).

By definition, a BOL is plain text, revealing important structure specific information (e.g., number of nodes and thus the size of the document, hierarchy relationship among the nodes). Encryption over such BOL numbers protects this undesired information from discovery by adverse parties. An encryption function, denoted as $f_e$, is used to generate order preserving numeric values over $f_{order}$ and $f_{level}$.

To achieve this encryption, the BOL of node a can be designated as $B_a$. The EBOL of node a can be denoted as $E_a$, which is defined as:

$$(f_e(f_{order}(B_a)), f_e(f_{level}(B_a)))$$

While $f_e(f_{order}(B_a))$, is performed for each node a, $f_e(f_{level}(B_a))$ is performed if node a is the first node in a level. The EBOL preserves exactly the same properties of the BOL to provide an encrypted, or sanitized document 920. As the EBOL value is generated by the encryption operation, the actual node number and its depth level are hidden to prevent the first level information from being discovered.

Using node a as an example, an EBOL $E_a$ uniquely identifies node a in the document, and the document portion $d_a$ rooted at node a. $E_H^a$ is provided as the largest EBOL of a parsed node in the document portion $d_a$, such that $E_H^a > E_z > E_a$, where z refers to a node in $d_a$. Accordingly, node a is the parent of nodes b and c with EBOLs $E_b$ and $E_c$, respectively. If node b is the left child of node a, then $E_c > E_b > E_a$.

Accordingly, the document 920 is the EBOL representation of the document 910. The EBOL of the node c is pair that includes an integer 35 and its depth level 14. The first integer is an order preserving encrypted value that is computed over the unique integer of the BOL associated with node c. The second integer is an order preserving encrypted value that is computed over the depth level of node c. In the exemplar document 920 of FIG. 9, the highest EBOL of node c (i.e., $E_H^c$) in the document portion rooted at node c is the EBOL of the node g (i.e., (103, 27)).

Referring now to FIG. 10, the structure encoding and encrypting of the nodes a, b and c of FIG. 9 will be described. The structural entity of a node can be defined using a subtree rooted at that node. In accordance with implementations of the present disclosure, various encoding elements are introduced to encode such entities that will be encrypted before delivery to a content requester, for example.

By way of example, if node x is a node in a document $d_i$, then the node identifier of x, denoted as $N_x$ is a tuple of three elements: $doc_{id}$, $E_x$, and $E_H^x$, where $doc_{id}$ is the document identifier of $d_i$, $E_x$ is the EBOL of x, and $E_H^x$ is the highest EBOL in the document portion rooted at node x. A node identifier is not only unique for each node in a document but also for all documents in a system. The node identifier also uniquely identifies the document portion rooted at node x. Furthermore, the inclusion of the depth level in the node identifier (i.e., inside $E_x$) uniquely determines its depth level.

The node identifier is the structure signature of a node that is sent to the authorized content requesters during the subscription phase discussed above.

With regard to node integrity, the node content includes the node's attributes, their values and content inside the tag, but not the node's descendants. The node integrity is provided as a computed hash of the concatenation of the node identifier and the content, which computed hash is denoted as $I_x=H(N_x, Ct_x)$, where $N_x$ is the node identifier, $Ct_x$ is the content of node x, and H is a one way collision resistant hash function.

A structure encoding information, denoted as $SE_x$, of a node x in a document, is provided as:

$$SE_x=(N_x, I_x)$$

where $N_x$ is the node identifier and $I_x$ is the node integrity, respectively. Each node x is encoded as a pair of $[SE_x, N_z]$, where $SE_x$ is the structure encoding information of node x and $N_z$ is the node identifier of the parent node z of x. For the root node of a document the encoded node is $[SE_x]$.

Each encoded node is encrypted using the shared key between the content provider and the content requester. After encryption, a node x is represented as $[N_x, E_p^x]$, where $N_x$ is the structure signature of the node x and $E_p^x$ is the encrypted value of the following, $[SE_x, N_z]$, where $SE_x$ is the structure encoding of the node x, and $N_z$ is the node identifier (i.e., structure signature) of the parent of x.

The validity phase, discussed above, includes an EBOL-based integrity verification routine. An authorized user, or content requester, denoted as s, has access to a list of structure signatures, denoted as $N_s$, as received in the subscription phase. The set of encrypted and encoded nodes delivered to the user s is denoted as $N_r$. The content requester s performs the following verification:

1. (S-I), if the node content has been changed.
2. (S-II), if some XML nodes have not been delivered.
3. (S-III), if some nodes have been moved.
4. (S-IV) if the node order has been changed.

The content requester s decrypts the received XML nodes in $N_r$. Denoting x as a received node, the content requester is provided with the following encoded node upon encrypting the received node x:

$$[x, N_x, [SE_x, N_z]]=[(x, N_x), [<N_x, I_x, N_z]]$$

The content requester s takes the outer $N_x$ and the content $Ct_x$ of node x and computes the hash of node x as $I_x'=H(N_x, Ct_x)$ locally. $I_x'$ is compared with the $I_x$ of $SE_x$. If any mismatch is found then the node content has been changed (i.e., S-I verified).

The content requester s further checks the belong-to relation between all node identifiers of $N_s$ and the received node identifiers in $N_r$. This check is provided as:

$$(\forall a \in N_s, \exists r \in N_r | (E_r, E_H^r)=(E_a', E_H^{'a}))$$

That is, for each node in $N_s$, if there is an identical EBOL identifier in $N_r$, then all the nodes have been delivered to the content requester s. If there is a node n in $N_s$ that the content requester s has authorization for, but does not match with any node in $N_r$, then node n has not been delivered to the content requester s (i.e., S-II verified).

The verification continues as the value of the node identifier $N_x$ must match with the inner node identifier $N_x$. If there is no match, then an integrity violation is noted and the node x is immediately discarded without knowing the precise violation. More specifically, the elements first node identifier $N_x$ are compared with the corresponding elements of the inner node identifier. If $f_{order}(E_x) \neq f_{order}(E_x')$, where $E_x'$ is in the inner node identifier $N_x$, then an order change is detected. If $f_{level}(E_x)=f_{level}(E_x')$ then the depth level of x in the first node identifier $N_x$ is compared with the depth level of in the inner node identified. If they do not match, then the node x is moved to another depth level (i.e., S-III semi verified).

The success of previous element-wise matching does not guarantee complete integrity. To check further, the depth level of the first node identifier $N_x$ is compared with the depth level of the parent node z of node x in the inner node identifier $N_z$. If the latter is not less than one of the former, then the node x is moved to the same depth level (i.e., S-III fully verified). During the breadth first order traversal for a current node x, if EBOL $E_x$ is less than any previously visited node's EBOL, then an integrity violation is detected. No such detection verifies that no order changes occurred in the received nodes (i.e., S-IV verified).

As discussed above, EBOL-based parsing avoids explicit hierarchy representation of the nodes in memory. This is achieved by utilizing a FIFO queue to store all of the children nodes of one level during parsing. In particular, by storing the parsed children of a node in a FIFO queue, memory required for hierarchy relationship of the nodes is freed. As the nodes are stored in the queue in FIFO order, EBOL-based parsing implicitly preserves a node's hierarchy information. As such, the space complexity is only about the nodes of a tree level that are stored in the FIFO queue. The average memory space required for a node x and its EBOL identifier are denoted as $s_x$ and $s_e$, respectively. The EBOL-based parsing processes one level of nodes of a document tree at once and frees the memory afterwards. Consequently, the required memory space is proportional to $O(ms_x s_e)$ for m children nodes in a level. The memory space required would be d times of this proportion, if the full document tree of depth d would be loaded in memory, as is the case for tree based XML parsing (e.g., DOM).

The EBOL-based parsing provided herein can be implemented for memory efficient processing of large XML documents, which can foster, for example, the adoption of SOA architectures that typically require the routing, comparison or mapping of large XML business documents. One example that shows the need of such memory efficient processing is ccBPM (BPEL process engine being part of XI) provided by SAP AG. The EBOL-based parsing can also be implemented to detect precise integrity violation(s) of business data as represented in enterprise XML documents. The detection of such integrity violation(s) may be required by internal and external policies and regulations.

Figure 11:
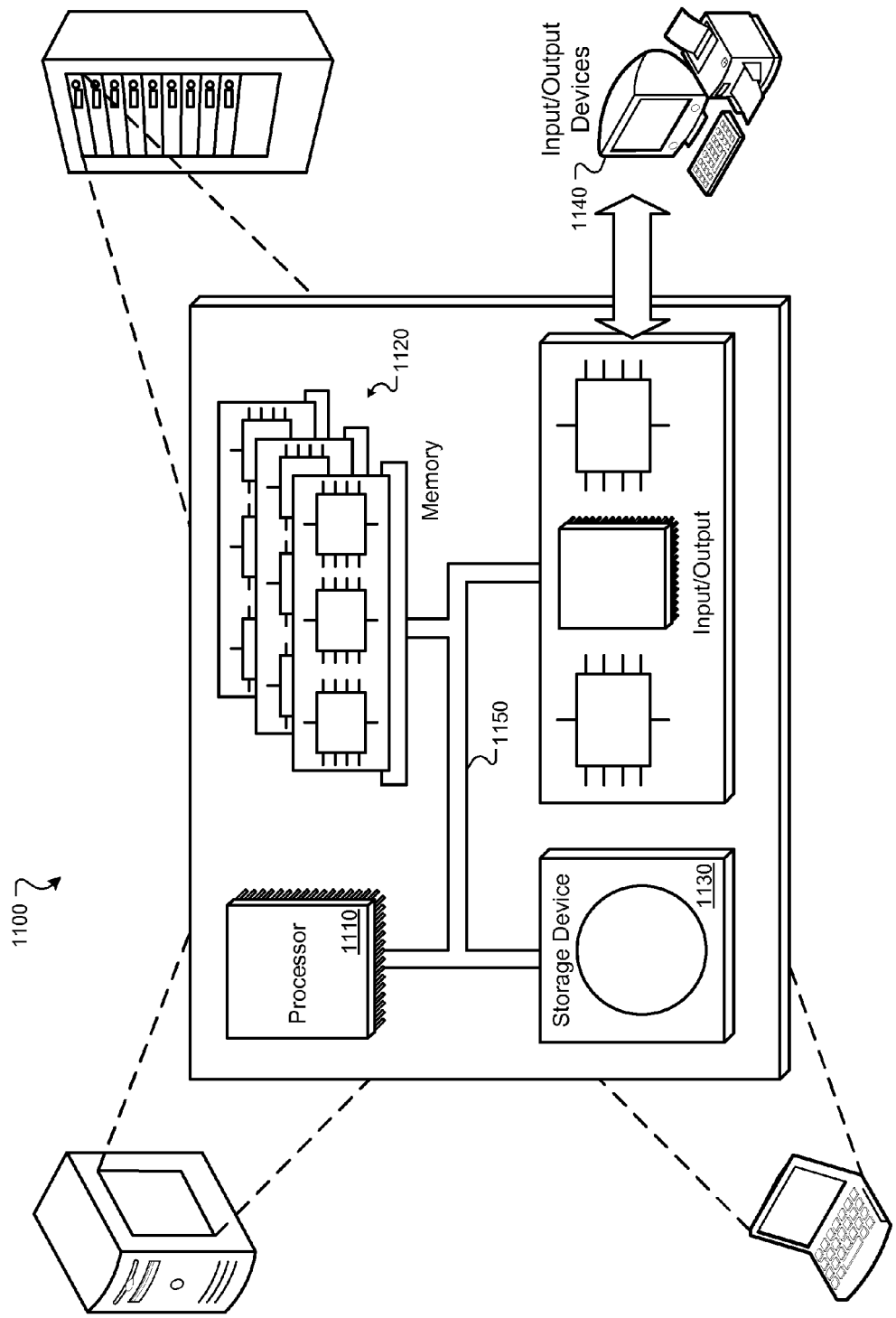
FIG. 11 is a schematic illustration of exemplar computer systems that can be used to execute implementations of the present disclosure.

Referring now to FIG. 11, a schematic diagram of an exemplar computer system 1100 is provided. The system 1100 can be used for the operations described in association with the implementations described herein. For example, the system 1100 may be included in any or all of the server components discussed herein. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit. The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device. The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of comparing a first structured data document to a second structured data document, comprising:
   receiving, at a computing device, the first and second structured data documents as first and second encrypted documents, respectively, the first and second encrypted documents being transmitted to the computing device from a remote computing device over a network, structure and content of each of the first and second encrypted documents being encrypted using encrypted integer labels (EBOL), wherein encrypting the first and second structured data documents comprises, for each node of each of the first and second structured data documents:
      assigning an integer pair comprising a unique identifier and a depth of the node,
      encrypting the integer pair to provide an encrypted integer pair, and
      encrypting structure encoding information of the node,
   comparing nodes of the first encrypted document to nodes of the second encrypted document, a content and a location of each of the nodes remaining confidential during the comparing;
   generating matched pairs of nodes based on the comparing, and storing the matched pairs in computer memory, each matched pair comprising a node of the first encrypted document and a corresponding node of the second encrypted document;
   determining one or more edit operations based on the matched pairs; and
   generating an edit script comprising the one or more edit operations, the edit script being executable by one or more processors to transform the first encrypted document to provide a transformed encrypted document that is isomorphic to the second encrypted document.

2. The computer-implemented method of claim 1, wherein determining one or more edit operations comprises:
   executing a difference function to process an encrypted value of a first node of the matched pair and an encrypted value of a second node of the matched pair;
   generating a non-zero value based on the executing;

generating an update operation to update the encrypted value of the first node based on the encrypted value of the second node; and adding the update operation to the edit script.

3. The computer-implemented method of claim 1, wherein determining one or more edit operations comprises:

determining that a node of the first encrypted document is absent from the matched pairs;

generating a delete operation to delete the node; and adding the delete operation to the edit script.

4. The computer-implemented method of claim 1, wherein determining one or more edit operations comprises:

determining that a node of the second encrypted document is absent from the matched pairs;

generating an insert operation to insert the node; and adding the insert operation to the edit script.

5. The computer-implemented method of claim 1, wherein determining one or more edit operations comprises:

determining that a sibling node of a first node of a matched pair and a sibling node of a second node of the matched pair are different;

generating a move operation to move the first node such that a sibling node of the first node is the same as the sibling node of the second node; and adding the move operation to the edit script.

6. The computer-implemented method of claim 1, wherein the first and second encrypted documents each include a tree data structure, and the comparing includes a level-by level comparison of nodes of the first and second encrypted documents from root to leaves.

7. The computer-implemented method of claim 1, wherein the edit script is provided as a minimum cost edit script (MCES).

8. The computer-implemented method of claim 1, further comprising transmitting the edit script to the remote computing device over the network.

9. A non-transitory computer-readable storage medium coupled to one or more processors having instructions stored thereon which, when executed by the one or more processors, cause the one or more processors to perform operations to compare a first structured data document to a second structured data document, the operations comprising:

receiving the first and second structured data documents as first and second encrypted documents, respectively, the first and second encrypted documents being transmitted from a remote computing device over a network, structure and content of each of the first and second encrypted documents being encrypted using encrypted integer labels (EBOL), wherein encrypting the first and second structured data documents comprises, for each node of each of the first and second structured data documents:

assigning an integer pair comprising a unique identifier and a depth of the node, encrypting the integer pair to provide an encrypted integer pair, and encrypting structure encoding information of the node, comparing nodes of the first encrypted document to nodes of the second encrypted document, a content and a location of each of the nodes remaining confidential during the comparing;

generating matched pairs of nodes based on the comparing, and storing the matched pairs in computer memory, each matched pair comprising a node of the first encrypted document and a corresponding node of the second encrypted document;

determining one or more edit operations based on the matched pairs; and generating an edit script comprising the one or more edit operations, the edit script being executable by one or more processors to transform the first encrypted document to provide a transformed encrypted document that is isomorphic to the second encrypted document.

10. The computer-readable storage medium method of claim 9, wherein determining one or more edit operations comprises:

executing a difference function to process an encrypted value of a first node of the matched pair and an encrypted value of a second node of the matched pair;

generating a non-zero value based on the executing;

generating an update operation to update the encrypted value of the first node based on the encrypted value of the second node; and adding the update operation to the edit script.

11. The computer-readable storage medium of claim 9, wherein determining one or more edit operations comprises:

determining that a node of the first encrypted document is absent from the matched pairs;

generating a delete operation to delete the node; and adding the delete operation to the edit script.

12. The computer-readable storage medium of claim 9, wherein determining one or more edit operations comprises:

determining that a node of the second encrypted document is absent from the matched pairs;

generating an insert operation to insert the node; and adding the insert operation to the edit script.

13. The computer-readable storage medium of claim 9, wherein determining one or more edit operations comprises:

determining that a sibling node of a first node of a matched pair and a sibling node of a second node of the matched pair are different;

generating a move operation to move the first node such that a sibling node of the first node is the same as the sibling node of the second node; and adding the move operation to the edit script.

14. The computer-readable storage medium of claim 9, wherein the first and second encrypted documents each include a tree data structure, and the comparing includes a level-by-level comparison of nodes of the first and second encrypted documents from root to leaves.

15. A system, comprising:

one or more processors; and a computer-readable storage medium coupled to the one or more processors having instructions stored thereon which, when executed by the one or more processors, cause the one or more processors to perform operations to compare a first structured data document to a second structured data document, the operations comprising:

receiving the first and second structured data documents as first and second encrypted documents, respectively, the first and second encrypted documents being transmitted from a remote computing device over a network, structure and content of each of the first and second encrypted documents being encrypted using encrypted integer labels (EBOL), wherein encrypting the first and second structured data documents comprises, for each node of each of the first and second structured data documents:

assigning an integer pair comprising a unique identifier and a depth of the node, encrypting the integer pair to provide an encrypted integer pair, and encrypting structure encoding information of the node, comparing nodes of the first encrypted document to nodes of the second encrypted document, a content and a location of each of the nodes remaining confidential during the comparing;

generating matched pairs of nodes based on the comparing, and storing the matched pairs in computer memory, each matched pair comprising a node of the first encrypted document and a corresponding node of the second encrypted document;

determining one or more edit operations based on the matched pairs; and generating an edit script comprising the one or more edit operations, the edit script being executable by one or more processors to transform the first encrypted document to provide a transformed encrypted document that is isomorphic to the second encrypted document.

16. The system of claim 15, wherein determining one or more edit operations comprises:

executing a difference function to process an encrypted value of a first node of the matched pair and an encrypted value of a second node of the matched pair;

generating a non-zero value based on the executing;

generating an update operation to update the encrypted value of the first node based on the encrypted value of the second node; and adding the update operation to the edit script.

17. The system of claim 15, wherein determining one or more edit operations comprises:

determining that a node of the first encrypted document is absent from the matched pairs;

generating a delete operation to delete the node; and adding the delete operation to the edit script.

18. The system of claim 15, wherein determining one or more edit operations comprises:

determining that a node of the second encrypted document is absent from the matched pairs;

generating an insert operation to insert the node; and adding the insert operation to the edit script.

19. The system of claim 15, wherein determining one or more edit operations comprises:

determining that a sibling node of a first node of a matched pair and a sibling node of a second node of the matched pair are different;

generating a move operation to move the first node such that a sibling node of the first node is the same as the sibling node of the second node; and adding the move operation to the edit script.

20. The system of claim 15, wherein the first and second encrypted documents each include a tree data structure, and the comparing includes a level-by-level comparison of nodes of the first and second encrypted documents from root to leaves.

* * * * *